US012767502B2

(12) United States Patent
Redoutey et al.

(10) Patent No.: US 12,767,502 B2
(45) Date of Patent: Oct. 20, 2026

(54) CONTINUOUS EQUILIBRIUM STRUCTURES THAT COUNTERACT GRAVITY IN ANY ORIENTATION

(71) Applicant: THE REGENTS OF THE UNIVERSITY OF MICHIGAN, Ann Arbor, MI (US)

(72) Inventors: Maria Redoutey, Rochester, MI (US); Evgueni T. Filipov, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 362 days.

(21) Appl. No.: 18/634,024

(22) Filed: Apr. 12, 2024

(65) Prior Publication Data

US 2024/0351833 A1 Oct. 24, 2024

Related U.S. Application Data

(60) Provisional application No. 63/461,377, filed on Apr. 24, 2023.

(51) Int. Cl.
*B66F 3/22* (2006.01)
*B25J 19/00* (2006.01)

(52) U.S. Cl.
CPC ............. *B66F 3/22* (2013.01); *B25J 19/0016* (2013.01)

(58) Field of Classification Search
CPC ................................ B66F 3/22; B25J 19/0016
See application file for complete search history.

(56) References Cited

U.S. PATENT DOCUMENTS 6,215,081 B1 * 4/2001 Jensen ..................... H01H 3/46
200/341

OTHER PUBLICATIONS

M.Redoutey et al., “Designing Continuous Equilibrium Structures That Counteract Gravity In Any Orientation”, Aug. 3, 2022, pp. 1-9.

* cited by examiner

*Primary Examiner* — Tyrone V Hall, Jr.
(74) *Attorney, Agent, or Firm* — Harness, Dickey & Pierce, P.L.C.

(57) ABSTRACT

A system and method to transform reconfigurable structures into systems with continuous equilibrium. The system and method are based on adding optimized springs that counteract gravity to achieve a system with a nearly flat potential energy curve. The resulting structures can move or reconfigure effortlessly through their kinematic paths and remain stable in all configurations. The method enhances system design to maintain continuous equilibrium during reorientation, so that a system maintains a nearly flat potential energy curve even when it is rotated in space. This ability to reorient while maintaining continuous equilibrium greatly enhances the versatility of deployable and reconfigurable structures by ensuring they remain efficient and stable for use in different scenarios.

18 Claims, 16 Drawing Sheets

CONTINUOUS EQUILIBRIUM STRUCTURES THAT COUNTERACT GRAVITY IN ANY ORIENTATION

CROSS-REFERENCE TO RELATED APPLICATIONS

This application claims the benefit of U.S. Provisional Application No. 63/461,377, filed on Apr. 24, 2023. The entire disclosure of the above application is incorporated herein by reference.

GOVERNMENT INTEREST

This invention was made with government support under 1943723 awarded by the National Science Foundation. The government has certain rights in the invention.

FIELD

The present disclosure relates to reconfigurable structures and, more particularly, relates to continuous equilibrium structures that counteract gravity in any orientation.

BACKGROUND & SUMMARY

This section provides background information related to the present disclosure which is not necessarily prior art. This section provides a general summary of the disclosure, and is not a comprehensive disclosure of its full scope or all of its features.

Reconfigurable structures are systems with components that move, or reconfigure, along a prescribed kinematic path in order to achieve one or more functions. Examples include robots and robotic arms, adaptive building facades, deployable bridges and canopies, stowable solar arrays, furniture, micro-grippers, and retractable roofs. For decades, research has focused on the kinematics, mobility, and stress states of reconfigurable structures. A fundamental challenge that remains is efficiently actuating them while preserving stiffness and stability, especially in applications where gravity has a significant effect. In many designs, reconfiguration requires a large input of energy, resulting in inefficient, over-designed, and costly structures that are impractical to fabricate and operate.

Continuous equilibrium systems are a subset of reconfigurable structures with a kinematic mode that allows them to reconfigure with a negligible input of energy. Continuous equilibrium is also described as neutral stability or zero stiffness, and is characterized by a constant potential energy curve throughout reconfiguration. Advantages of systems with continuous equilibrium include low energy required for actuation and an inherently stable reconfiguration path that avoids instabilities and dynamic snap-through behaviors.

Under gravity, most reconfigurable structures do not have continuous equilibrium with a constant potential energy curve; rather, the potential energy is affected by gravity as the structure moves through its kinematic path. The potential energy curve of a system is also affected by elements such as counterweights, springs, or magnets. Continuous equilibrium is attained when the potential energy contributions of these components offset the potential energy due to gravity. Examples include the Anglepoise desk lamp, where prestressed springs allow the lamp to be easily repositioned, bascule bridges which utilize a counterbalance to open, and chairs which can be easily adjusted to recline at any angle.

Continuous equilibrium has been attained in structures through the addition of zero-free-length springs, an initial plastic deformation, a temperature gradient, thermal residual stresses, or coupled components with offsetting deformations. Structures can be designed to match a prescribed energy landscape (including a landscape corresponding to continuous equilibrium) by numerically computing the appropriate spring properties. Despite these examples, there is currently no comprehensive framework to transform structures into systems with continuous equilibrium while considering gravity. In most previous studies, gravity has been ignored, or systems are either trivial to design or designed by trial and error. Additionally, all previous work has focused on achieving continuous equilibrium in only one specific orientation. If the entire structure is reoriented with respect to the ground (thus changing the potential energy curve due to gravity), continuous equilibrium is not maintained.

In accordance with some aspects of the present disclosure, a framework to design structures that maintain continuous equilibrium as they reconfigure though their kinematic path and are reoriented in three-dimensional space is provided. The method involves computing properties of springs that directly offset the potential energy due to gravity. In the present disclosure, we first discuss the optimization setup used to find spring parameters that transform a simple linkage into a continuous equilibrium structure. Next, we explore how continuous equilibrium can be maintained as systems are reoriented in three-dimensional space. Then we apply the method to other linkages and expand to more complex systems. Finally, we use traditional structural engineering methods to explore the practical considerations for the use of these systems.

In accordance with further aspects of the present disclosure, a framework that can transform reconfigurable structures into systems with continuous equilibrium is provided. The method involves adding optimized springs that counteract gravity to achieve a system with a nearly flat potential energy curve. The resulting structures can move or reconfigure effortlessly through their kinematic paths and remain stable in all configurations. More importantly, according to the present teachings, it is possible to design systems that maintain continuous equilibrium during reorientation, so that a system maintains a nearly flat potential energy curve even when it is rotated in space. This ability to reorient while maintaining continuous equilibrium greatly enhances the versatility of deployable and reconfigurable structures by ensuring they remain efficient and stable for use in different scenarios. The present framework is applied to several planar four-bar linkages and we explore how spring placement, spring types, and system kinematics affect the optimized potential energy curves. Next, we show the generality of our method with more complex linkage systems that carry external masses and with a three-dimensional origami-inspired deployable structure. Finally, we adopt a traditional structural engineering approach to give insight on practical issues related to the stiffness, reduced actuation forces, and locking of continuous equilibrium systems. Physical prototypes support the computational results and demonstrate the effectiveness of our method. The framework introduced in this work enables the safe, stable, and efficient actuation of reconfigurable structures under gravity, regardless of their global orientation. These principles have the potential to revolutionize the design of robotic limbs, retractable roofs, furniture, consumer products, vehicle systems, and more.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5A:
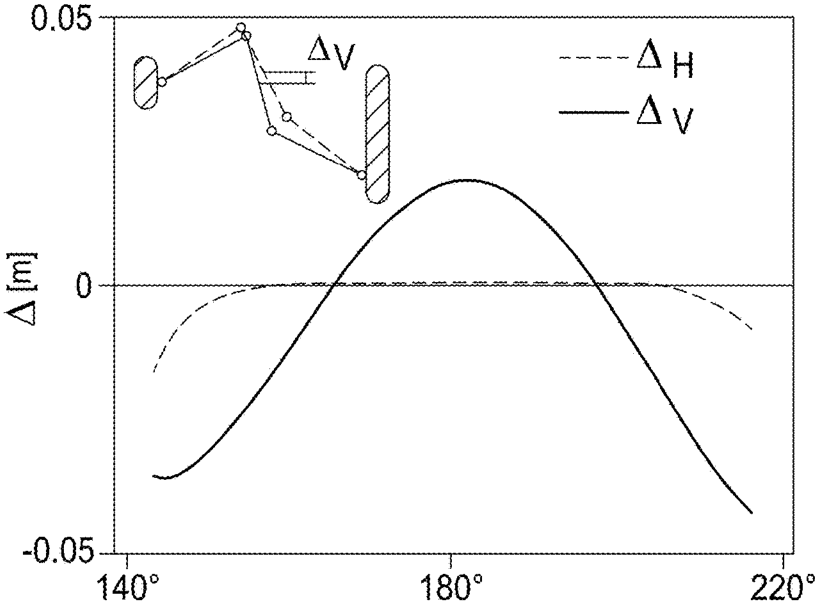
FIG. 5A illustrates that residual displacements may occur, even with springs optimized for continuous equilibrium. For an idealized and frictionless Watt's linkage, horizontal residual displacements are nearly zero for most of the kinematic path, and vertical residual displacements are small, but may be positive or negative from a desired configuration.
Figure 5B:
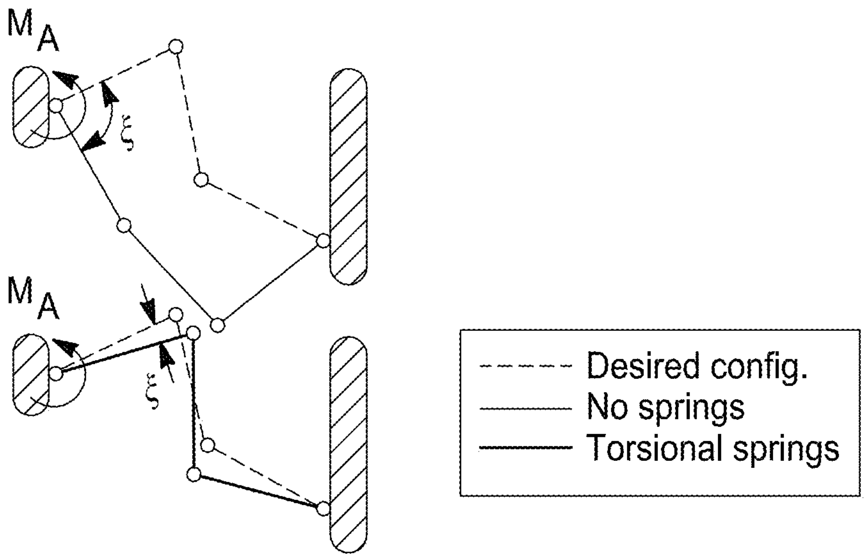
FIG. 5B illustrates an external actuator applies a moment at location A on the Watt's linkage. The angle $\xi$ describes the difference between the desired configuration (dashed lines) and the equilibrium position (due to gravity (gray solid lines) or gravity+springs (black solid lines)).
Figure 5C:
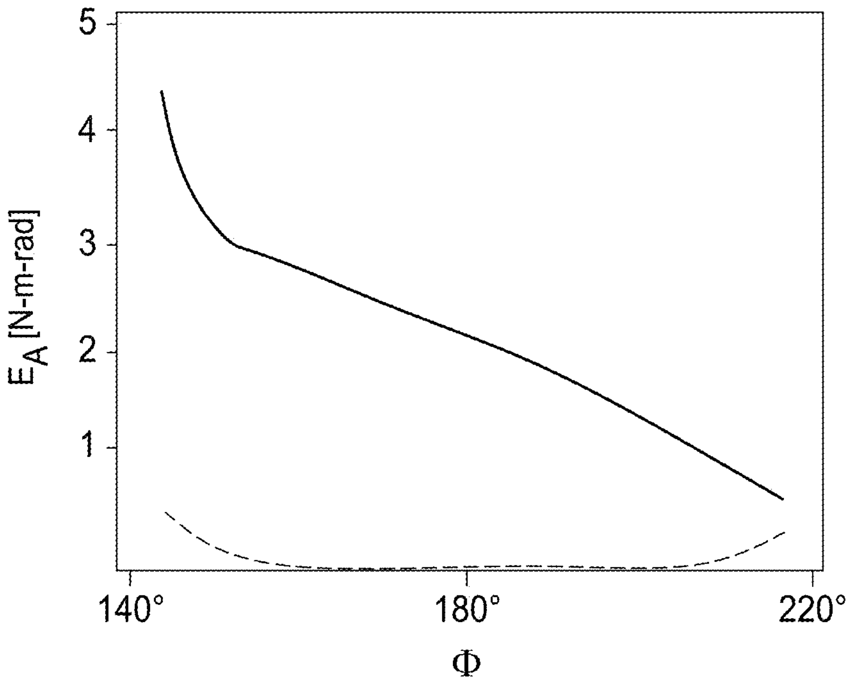
FIG. 5C illustrates that the energy in the actuator is nearly zero for the case with optimized torsional springs.
Figure 5D:
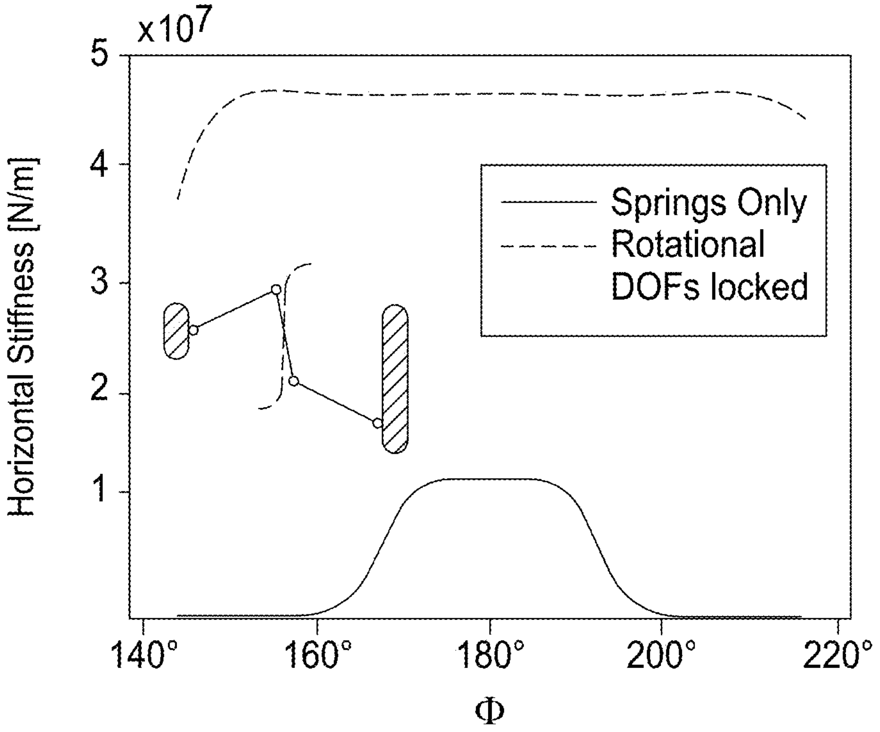

FIG. 5D illustrates that the Watt's linkage with springs has stiffness in the horizontal direction near the center of the kinematic path, where the midpoint of the floating bar traces a straight line. Towards the ends of the kinematic path, the stiffness nears zero. When all of the rotational DOFs are locked, the Watt's linkage has increased stiffness in the horizontal direction throughout the entire kinematic path.

Figure 5E:
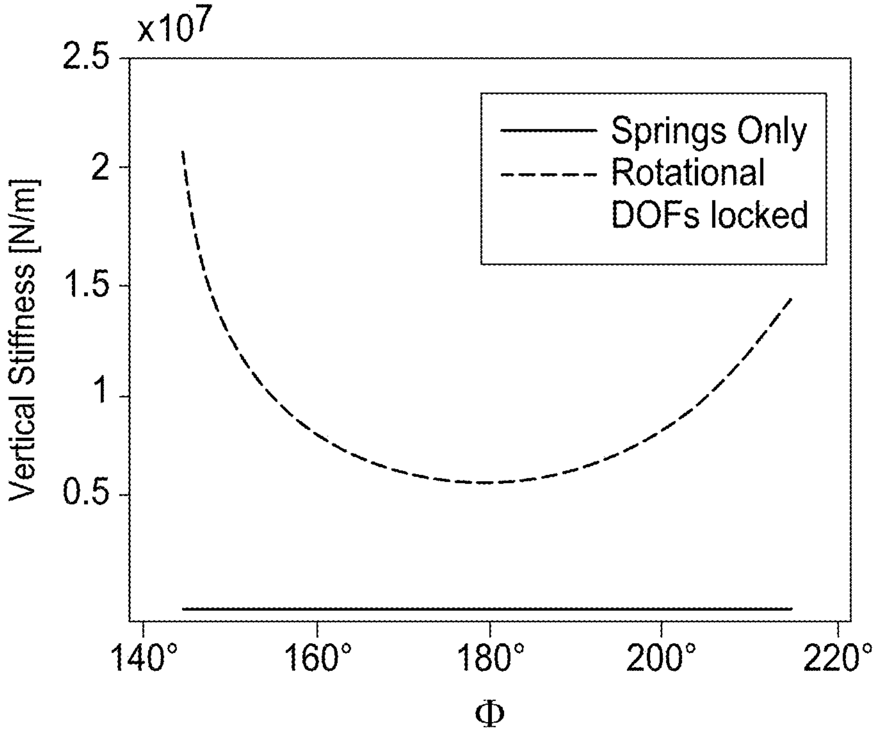

FIG. 5E illustrates that the stiffness in the vertical direction increases by several orders of magnitude when all rotational DOFs are locked.

Figure 5F:
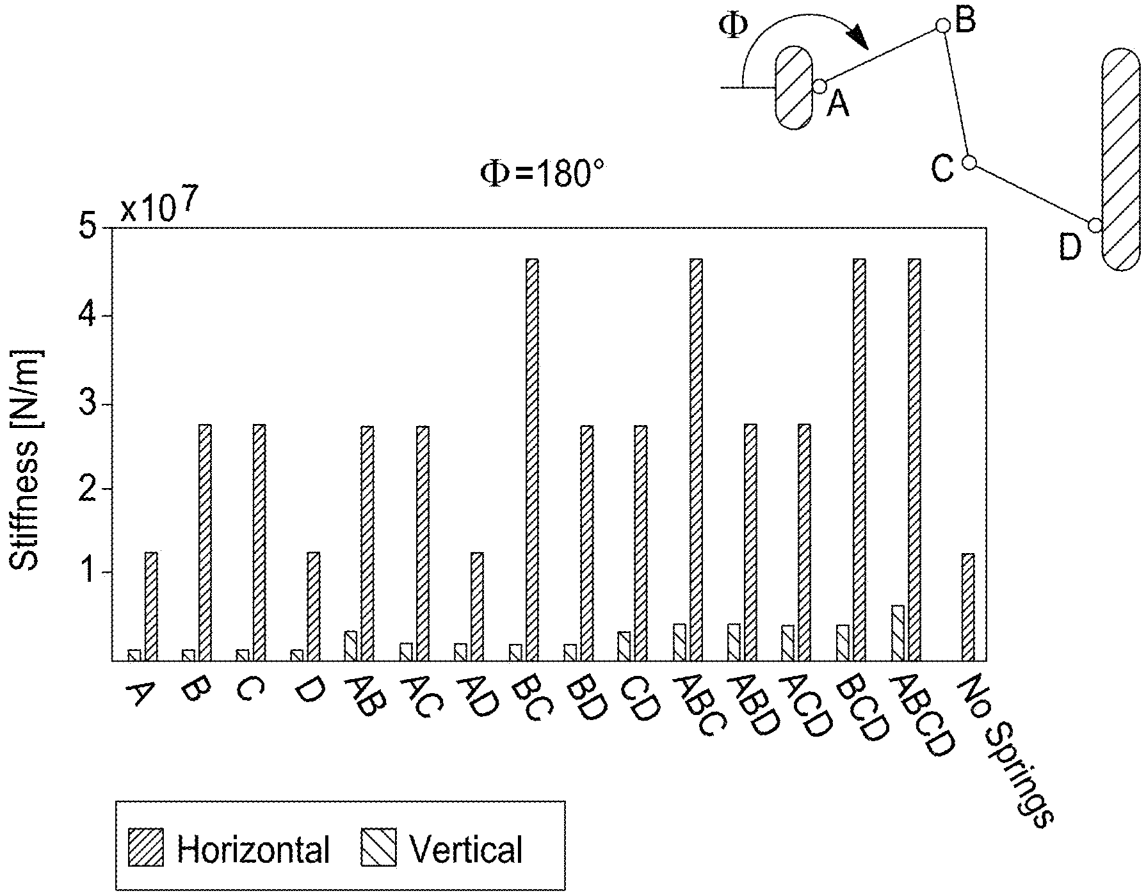

FIG. 5F illustrates that locking the rotational DOFs at location combinations BC, ABC, or BCD all achieve the same horizontal stiffness as locking at all locations (ABCD). In the vertical direction, locking more rotational DOFs increases the stiffness.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90° or at other orientations) and the spatially relative descriptors used herein interpreted accordingly.

Structures that move or reconfigure are ubiquitous in adaptable architecture, vehicle components, robotics, consumer goods, and more. However, because of gravity, these structures often require a large energy input to actuate and can become unstable and unsafe. According to the principles of the present teachings, a method for designing continuous equilibrium systems, where optimized springs counteract gravity to make a structure that remains stable and can be reconfigured with negligible energy input, is provided. More importantly, the present teachings ensure that systems maintain continuous equilibrium as they are reoriented, making them versatile for use in different application scenarios. These principles have the potential to revolutionize the design of reconfigurable structures by ensuring they remain safe, stable, and efficient for use in any orientation.

Structures that move or reconfigure are ubiquitous in adaptable architecture, vehicle components, robotics, consumer goods, and more. However, because of gravity, these structures often require a large energy input to actuate and can become unstable and unsafe. According to the principles of the present teachings, a method is provided for designing continuous equilibrium systems, where optimized springs counteract gravity to make a structure that remains stable and can be reconfigured with negligible energy input. More importantly, in some embodiments, the present method ensures that systems maintain continuous equilibrium as they are reoriented, making them versatile for use in different application scenarios. These principles have the potential to revolutionize the design of reconfigurable structures by ensuring they remain safe, stable, and efficient for use in any orientation.

Based on the present disclosure, a comprehensive system and method are provided for designing reconfigurable structures that maintain continuous equilibrium. The present method and system involves optimizing the properties of internal, external, torsional, and extensional springs that counteract gravity to minimize the fluctuation of the potential energy curve throughout the kinematic path. The optimization framework is extended to optimize structures for a range of orientations, leading to one design that has continuous equilibrium properties even as the orientation of the structure changes. Combinations of springs with asymmetric kinematics tend to result in better performance, and external springs are the most effective when considering a structure at multiple orientations. The present disclosure demonstrates how the design framework can be applied to real-world systems including a linkage with an external mass carried along a linear path, a linkage with a mass carried along a radial path, and a three-dimensional deployable origami arch. Using computational simulations and physical proof-of-concept prototypes, it is shown that the present continuous equilibrium structures enable more efficient actuation. Using optimization to design for continuous equilibrium results in reconfigurable structures that are more safe, stable, efficient, and versatile for any application scenario. The framework presented herein will expand the ability of designers and engineers to create versatile, multi-functional systems to be used in robotics, infrastructure, consumer products, architecture, and more.

Potential Energy of a Four-Bar Linkage

According to the principles of the present teachings, in some embodiments, four-bar linkages are used to demonstrate how simple reconfigurable structures can be transformed to have continuous equilibrium. Four-bar linkages are ubiquitous in engineering, found in robotics, biomechanics and bio-inspired design, automotive steering, surgical instruments, and many other fields.

Figure 1A:
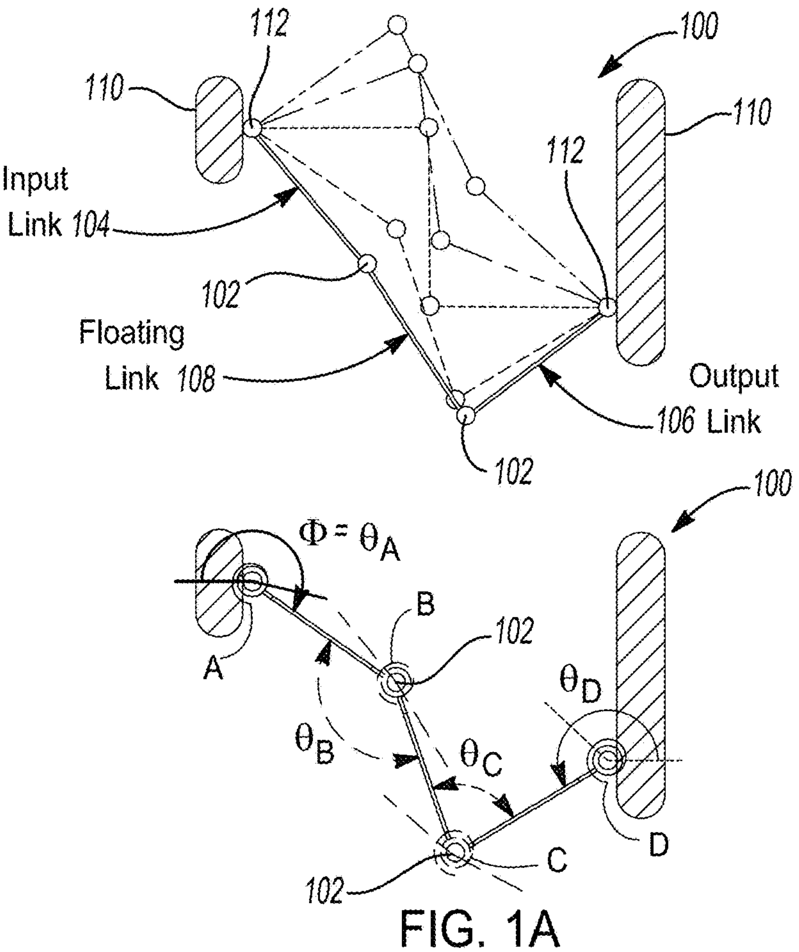
FIG. 1A is a schematic view of a Watt's linkage according to the principles of the present teachings, wherein the kinematics of the linkage are defined by the angle of the input link $\phi$ and includes four locations for torsional springs, with angles $\theta_A$, $\theta_B$, $\theta_C$, and $\theta_D$.

Generally, as illustrated in FIG. 1A, a planar four-bar linkage 100 consists of four rigid members connected with pinned joints 102, resulting in a one-degree of freedom (DOF) mechanism. The four bars are identified as the input link 104, output link 106, coupler (floating) link 108, and ground (fixed) link 110, which is an imaginary bar connecting the two support nodes 112. In the present disclosure, we limit the kinematics of the linkages to a range where no link rotates a full 360° with respect to an adjacent link. Although the kinematics, dynamics, design, and inertia loads of four-bar linkages have been studied; the effect of gravity and self-weight on their mechanics is generally not considered. Static balancing of four-bar linkages involves counteracting gravity with springs, but previous approaches to static balancing are limited to specific linkages in a static orientation. In contrast, the optimization approach of the present teachings can be applied to any arbitrary linkage at a range of orientations, thereby offsetting the effect of gravity such that a potential energy of the continuous equilibrium system is maintained generally constant irrespective of the orientation along a kinematic path in three-dimensional space.

Figure 1B:
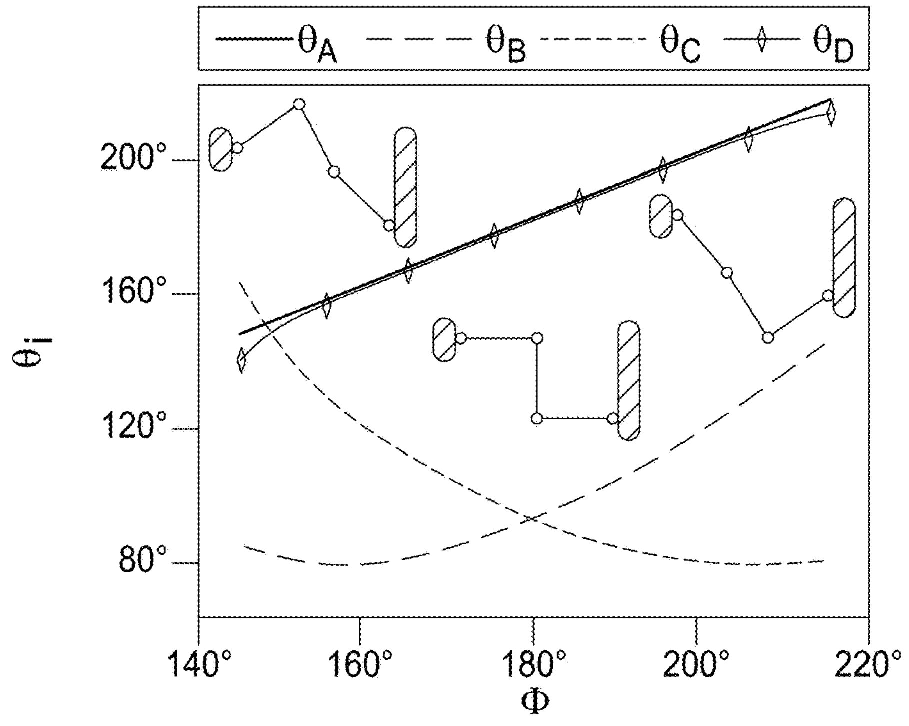
FIG. 1B is a graph illustrating that the angle of the four springs vary with link angle $\phi$.

By way of non-limiting exemplary system, the four-bar linkage of the present disclosure is predicated on the Watt's linkage (FIG. 1A). In some embodiments of the Watt's linkage of the present teachings, the system consists of three bars 104, 106, 108 of equal length (the imaginary fourth "bar," or fixed link, connects the two support nodes). The left end of the input link 104 is pinned one bar length above the right end of the output link 106. The kinematics of the Watt's linkage are defined by the angle @, and we consider only a section of the kinematic path: $\phi_{min}=145°\leq\phi\leq\phi_{max}=215°$ (FIG. 1B).

The potential energy of a bar i due to gravity is defined as $PE_{Gi}(\phi)=m_i*g*h_i(\phi)$, where $m_i$ is the mass of bar i, g=9.81 $m/s^2$, and $h_i$ is the height of the center of mass of bar i. The height is computed from a reference point 1 m below the support point of the output link 106. As the linkage moves through its kinematic path, the height of each bar changes, and so does the potential energy due to gravity; thus, $PE_{Gi}$ is a function of $\phi$. We assume the bars of all linkages have a length of 0.3 m and a uniform mass distribution of 1 kg/m unless otherwise noted.

According to the principles of the present invention, a method and system for achieving continuous equilibrium is to offset the potential energy due to gravity by adding springs, thus resulting in a flat total potential energy curve. In some embodiments, a torsional spring j, which has a linear stiffness $k_j$ (units: Nm/rad) and a rest angle $\alpha_j$ (units: rad), may be used. The potential energy in the spring is zero when the current angle of the spring $\theta_j$ is equal to the rest angle $\alpha_j$. The potential energy contribution of a torsional spring j is $PE_{Sj}(\phi)=\frac{1}{2}\,k_j(\theta_j(\phi)-\alpha_j)^2$.

For a given configuration ($\phi$), the total potential energy of a system with n bars and m springs is expressed as $$PE_T\phi = \sum\nolimits_i^n PE_{Gi}(\phi) + \sum\nolimits_j^m PE_{Sj}(\phi) \quad [1]$$

For an ideal system with continuous equilibrium, the $PE_T$ curve is perfectly flat. To quantify how flat the total potential energy curve is, we first compute the change in potential energy along the kinematic path, expressed as $$\Delta PE_T = \frac{d\,PE_T(\phi)}{d\phi} \quad [2]$$

To compute the total change in potential energy, we integrate the absolute value of the difference along the kinematic path, expressed as $$\sum|\Delta\ PE_T| = \int_{\phi min}^{\phi max}\left|\frac{d\,PE_{T(\phi)}}{d}\right|d\phi \quad [3]$$

The quantity $\Sigma|\Delta PE_T|$ is a measure of the fluctuation in the $PE_T$ curve, where $\Sigma|\Delta PE_T|=0$ corresponds to a perfectly flat line.

Optimizing Spring Properties for Continuous Equilibrium

In accordance with the present teachings, we aim to minimize $\Sigma|\Delta PE_T|$ of a system by finding appropriate spring parameters (stiffnesses and rest angles) that result in springs that counteract the effect of gravity. To compute the spring properties, we minimize the $\Sigma|\Delta PE_T|$ using the MATLAB function fmincon. As illustrated in FIGS. 1A, we define four possible locations for internal torsional springs on the Watt's linkage, labelled A, B, C, and D in FIG. 1A. The design parameters for the optimization problem are the four spring stiffnesses ($k_A$, $k_B$, $k_C$, $k_D$) and four rest angles ($\alpha_A$, $\alpha_B$, $\alpha_C$, $\alpha_D$). The lower bound for the stiffness terms is 0 N-m/rad and the range for the rest angle $\alpha_j$ is limited to the kinematic path defined by the corresponding angle $\theta_j$ (FIG. 1B). There are no additional constraints placed on the optimization problem, which is expressed as $$\min\left(\sum|\Delta PE_{T(\phi)}|\right) \quad [4]$$
$$\text{s.t. } k_j > 0$$
$$\alpha_j \in [\phi_{jmin}, \phi_{jmax}].$$

Figure 1C:
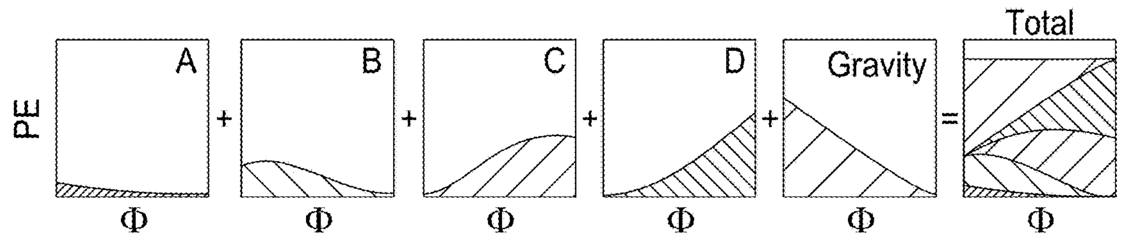
FIG. 1C illustrates that the potential energy contribution of four internal torsional springs (A, B, C, and D) and gravity can be summed and the total can result in a nearly flat potential energy curve.

The result of the optimization for the Watt's linkage with internal torsional springs at all four locations is shown in FIG. 1C. The individual plots show the potential energy contributions of each spring, and the total PE plot shows the aggregate result of all contributions, including gravity. The optimized spring parameters are $k_A$=0.396 N-m/rad, $\alpha_A$=199°; $k_B$=1.18 N-m/rad, $\alpha_B$=142°; $k_C$=1.23 N-m/rad, $\alpha_C$=158°; and $k_D$=2.04 N-m/rad, $\alpha_D$=139°. Qualitatively, the potential energy curve due to bar gravity is flattened with the addition of the potential energy stored in the springs. Quantitatively, we compare the optimized $\Sigma|\Delta PE_T|$ to the same measure considering only gravity, $\Sigma|\Delta PE_G|$. The $\Sigma|\Delta PE_G|=2.07$ is reduced to $\Sigma|\Delta PE_T|=0.065$ with the addition of springs; the $PE_T$ curve is 96.9% flatter than the $PE_G$ curve.

Figure 1D:
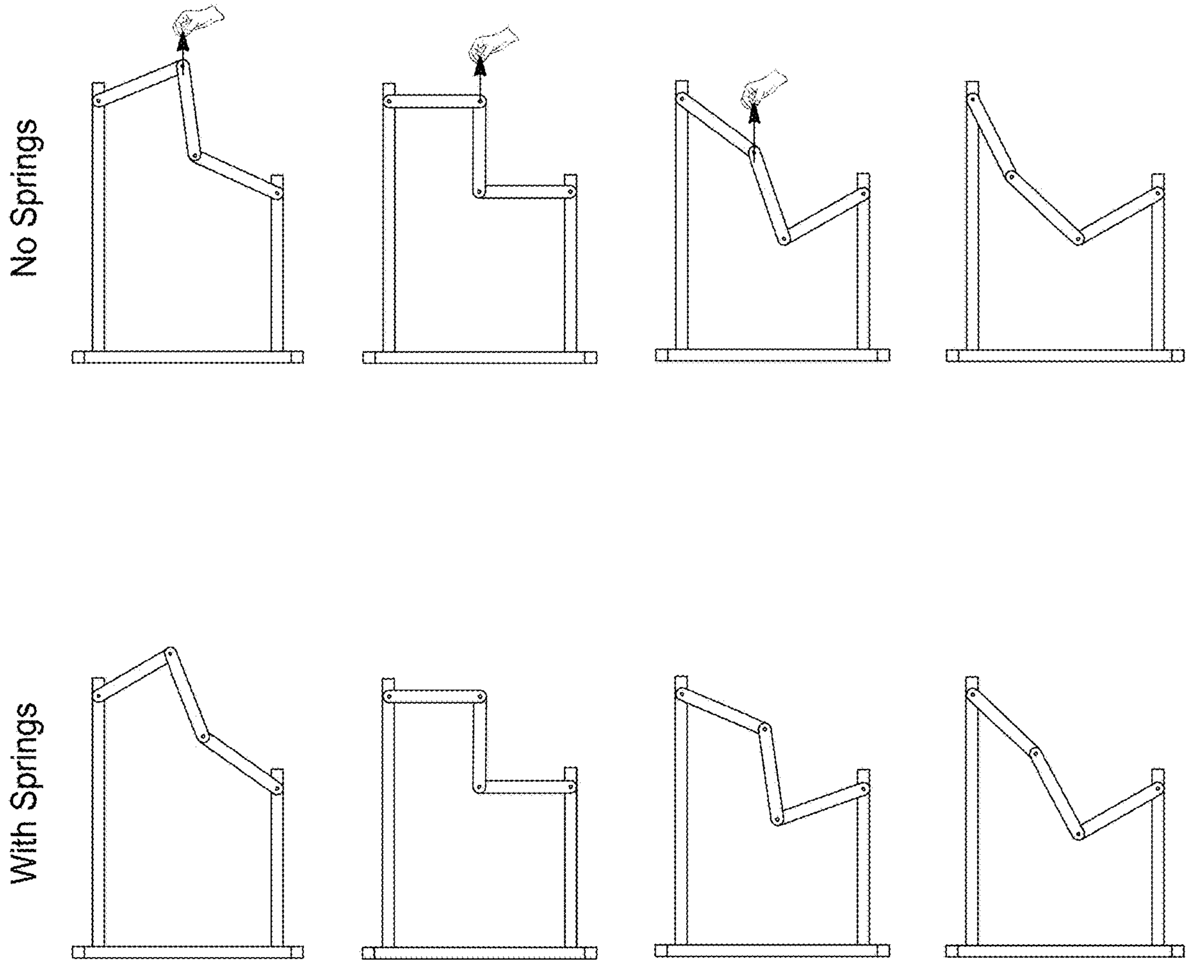
FIG. 1D illustrates experimental results that demonstrate that the Watt's linkage with four internal torsional springs according to the present invention can be reconfigured to any position along its kinematic path and it will remain in position, wherein the conventional system with no springs collapses under gravity.
Figure 1E:
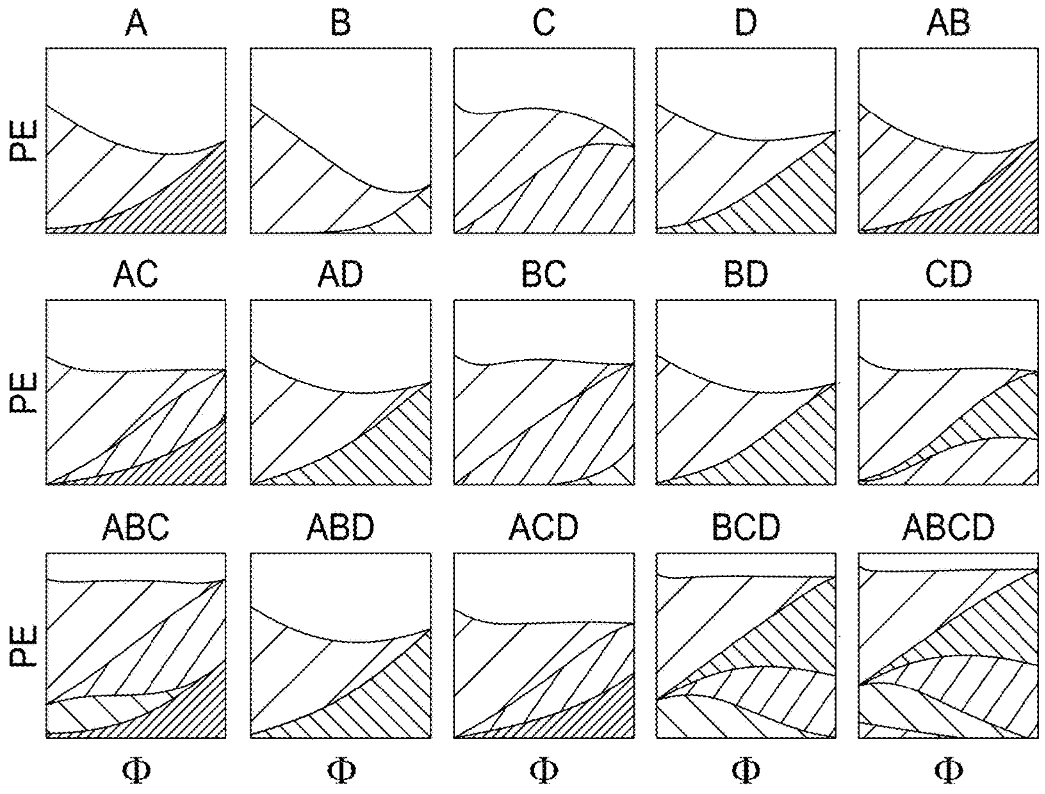
FIG. 1E illustrates a series of optimized potential energy curves for all possible combinations of internal torsional springs added to the Watt's linkage, and particularly illustrates that placing springs only at locations B, C, and D is as effective as using all four springs.
Figure 1F:
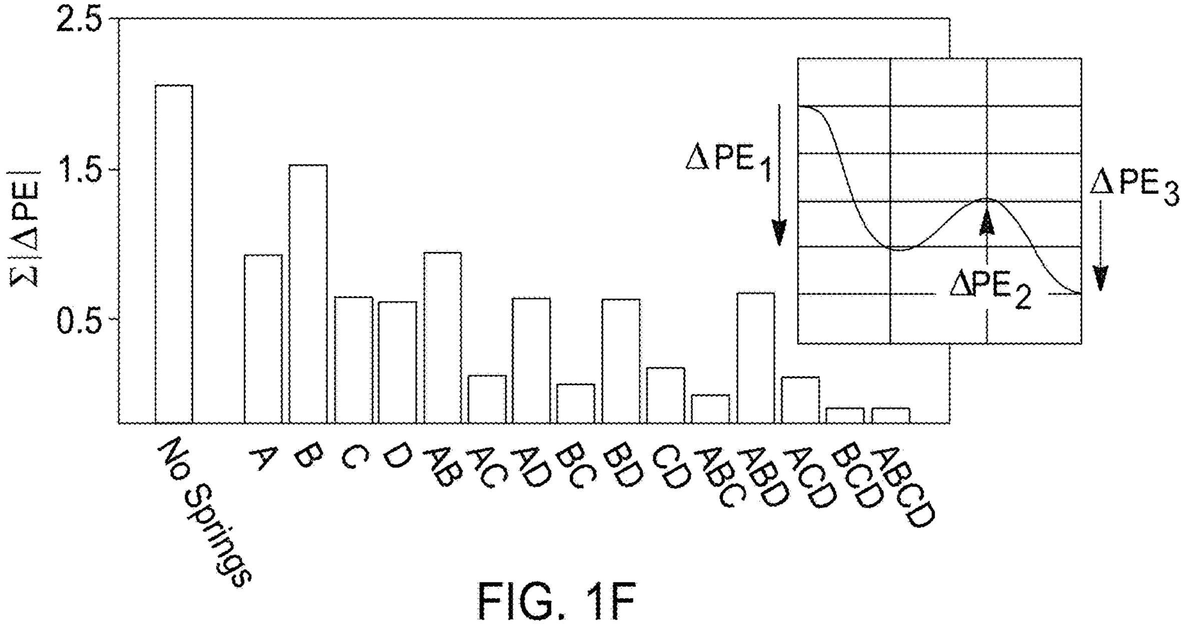
FIG. 1F illustrates a bar graph of the measure of the fluctuation in potential energy, $\Sigma|\Delta PE_T|$, for each spring combination case, wherein the fluctuation of the illustrative curve shown in the inset equals $|\Delta PE_1|+|\Delta PE_2]++\Delta PE_3|$.

We compare all possible combinations of springs at locations A, B, C, and D that can be used in the optimization of the Watt's linkage as illustrated in FIG. 1E. Certain combinations are more effective than others at flattening the potential energy curve. For example, when optimizing the linkage with only a single spring, placing the spring at location D reduces $\Sigma|\Delta PE_T|$ more than placing it at locations A or B (FIG. 1F). As a result, when optimizing a linkage with more than one spring, the stiffness of springs A and B approach zero for combinations AD, BD, and ABD; the same $\Sigma|\Delta PE_T|$ can be achieved by placing a spring only at location D. Combination BCD offers effectively the same level of reduction as using all four springs.

Physical prototypes of the Watt's linkage demonstrate how adding springs with optimized properties leads to a system with continuous equilibrium (FIG. 1D). The ideal properties of the springs were computed using the optimization framework, and springs with similar properties were used in the physical prototype. Without springs, the Watt's linkage collapses under gravity when a supporting force is removed. When the torsional springs are installed at locations A, B, C, and D, the linkage can be easily reconfigured into any position along its kinematic path. With springs, the linkage remains in the configuration in which it was placed and needs no additional forces to maintain its position.

Reorientation of Linkages

Figure 2A:
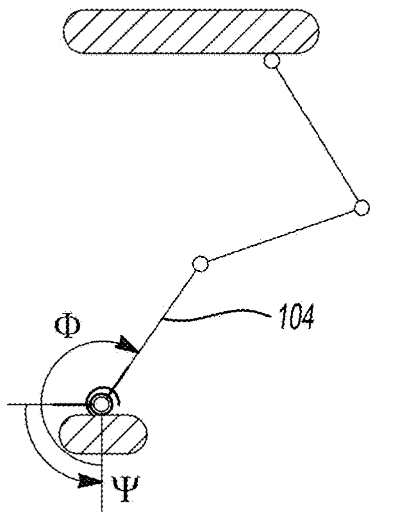
FIG. 2A is a schematic view illustrating reorientation of the Watt's linkage defined $\psi$, wherein an external torsional spring is connected to the input link and to a ground reference (horizontal).

In addition to reconfiguration through the kinematic path, structures can be reoriented, or rotated in space. For applications that require smooth motion in more than one orientation, such as robotics, it would be ideal to have one set of springs that ensure continuous equilibrium in all desired orientations. We define an orientation angle $\psi$ to describe the angle between a horizontal ground reference and the direction in which $\phi=0°$ (FIG. 2A). To change orientation, the linkage is rotated about the support attached to the input link 104. In the present disclosure, we consider a range of orientations $\psi=0°$ to 90°.

Figure 2B:
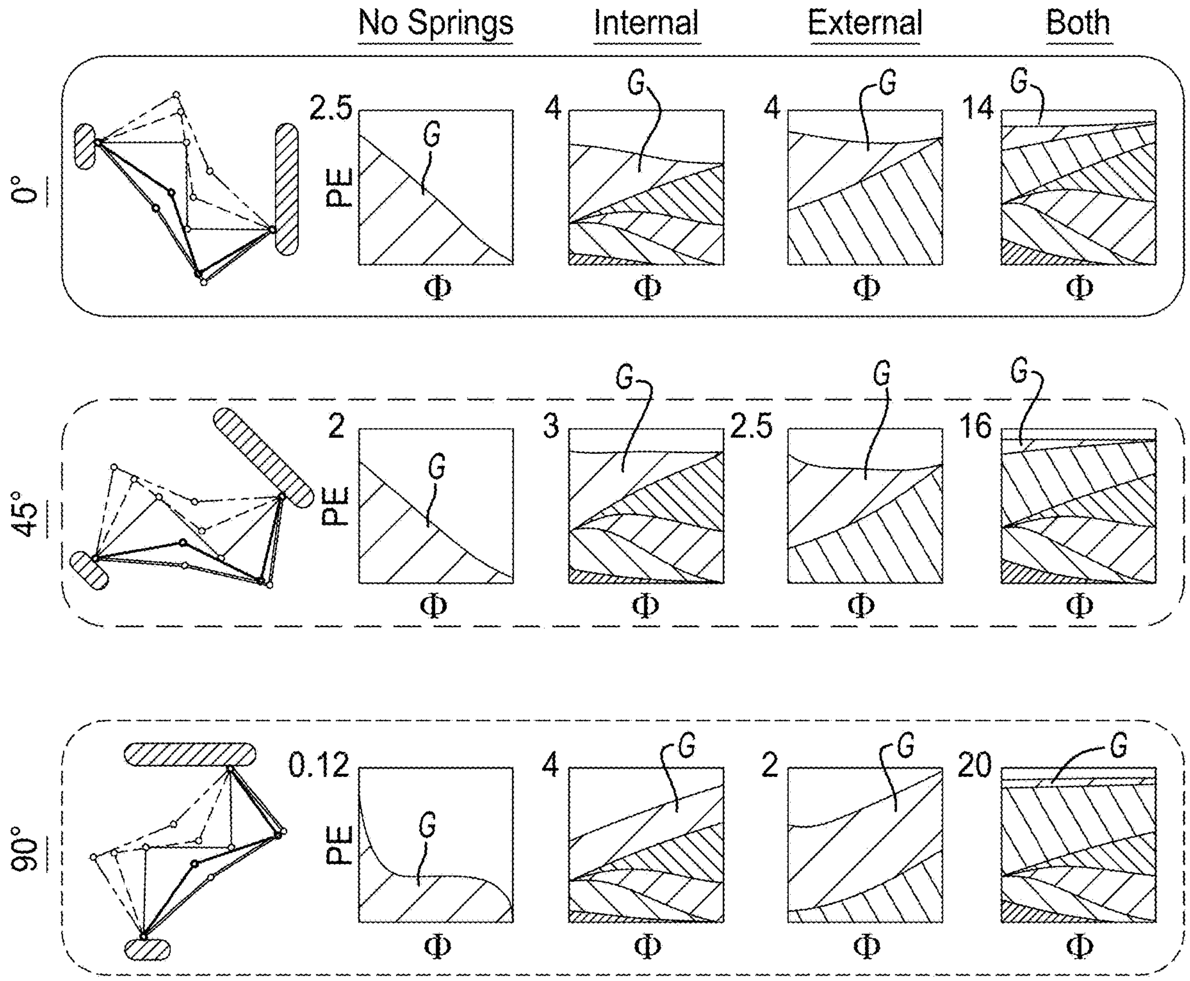
FIG. 2B is a series of potential energy curves for three orientations of the Watt's linkage ($\psi$=0°, 45°, and 90°). The linkage is optimized for cases with four internal torsional and/or one external torsional spring.

FIG. 2B shows the potential energy curves and contributions for the Watt's linkage at three orientations: $\psi=0°$, 45°, and 90°. The potential energy due to gravity (gray G plots) is now dependent on the orientation of the linkage as well as the configuration (i.e., $PE_G$ $(\phi,\psi)$). For $\psi=0°$ and 45°, the system has a potential energy minimum at the end of the kinematic path; thus, the linkage collapses under gravity (FIG. 2E). For $\psi=90°$, the linkage has a region of constant potential energy in the middle of the kinematic path. However, if the linkage is pushed outside of this range, it also collapses.

Figure 2C:
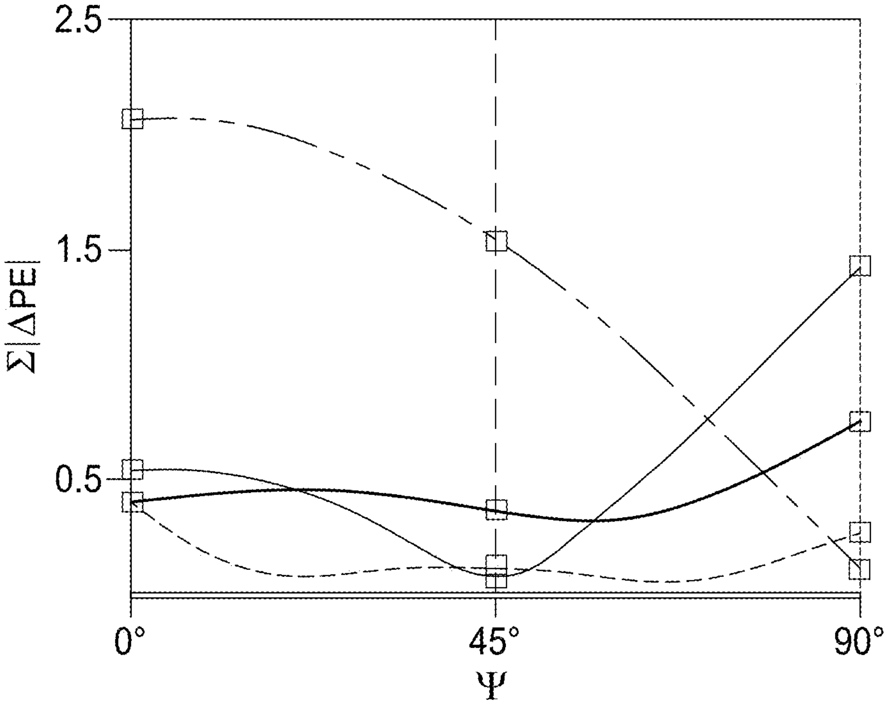
FIG. 2C is a graph illustrating the measure of the fluctuation in the potential energy curve over the kinematic path with respect to orientation w.

To evaluate continuous equilibrium over different orientations, we plot the value of $\Sigma|\Delta PE_T|$ with respect to the orientation $\psi$ (FIG. 2C). Taking the mean of $\Sigma|\Delta PE_T|$ over the range of w gives a measure of how close the structure is to continuous equilibrium at multiple orientations. As such, a mean $(\Sigma|\Delta PE_T|)=0$ indicates a structure with flat potential energy curves in all orientations. We use four internal torsional springs at locations A, B, C, and D to counteract gravity across multiple orientations. We set the optimization problem as:

$$\min\left(\text{mean}\left(\sum|\Delta PE_T(\phi,\psi)|\right)\right) \quad [5]$$
$$\text{s.t. } k_j > 0$$
$$\alpha_j \in \lfloor\theta_{jmin}, \theta_{jmax}\rfloor.$$

The potential energy in the internal springs does not change with respect to $\psi$, so their energy contributions are always the same, regardless of the orientation of the linkage ('Internal' column in FIG. 2B). As a result, $\Sigma|\Delta PE_T|$ is decreased more for some orientations than for others. The internal springs minimize $\Sigma|\Delta PE_T|$ most effectively for $\psi=45°$, where the resulting PET curve is nearly flat (FIGS. 2B-2C). For $\psi=90°$, however, adding internal springs makes the potential energy curve less flat than it was initially ($\Sigma|\Delta PE_T|$ is increased). Because the objective is to minimize the mean $(\Sigma|\Delta PE_T|)$, the optimization does not necessarily lead to the smallest $\Sigma|\Delta PE_T|$ for each individual orientation. However, across the range of orientations, adding internal springs reduces the mean $(\Sigma|\Delta PE_T|)$ to 0.578 N-m from 1.382 N-m when no springs are used, a 58% decrease (FIGS. 2C-2D).

Because the potential energy due to gravity is dependent on $\psi$, we next consider adding a single external torsional spring with one end attached to the horizontal ground reference and one end attached to the input link 104 of the Watt's linkage (FIG. 2A). The potential energy of this external spring depends on both $\phi$ and $\psi$, because the rest angle de is defined with respect to the ground reference. The potential energy in the external spring is: $PE_E=\frac{1}{2} k_E(\phi-\alpha^*)^2$, where $\alpha^*=\alpha_E+\psi$ accounts for the orientation of the linkage. The total potential energy for a system with an external torsional spring under gravity is expressed as $$PE_T(\phi,\psi) = \sum_i^n PE_{Gi}(\phi,\psi) + PE_E(\phi,\psi) \quad [6]$$

and the optimization problem can be rewritten as $$\min\left(\text{mean}\left(\sum|\Delta PE_T(\phi,\psi)|\right)\right) \quad [7]$$
$$\text{s.t. } k_E > 0$$
$$\alpha_E \in [0, 2\pi].$$

Figure 2D:
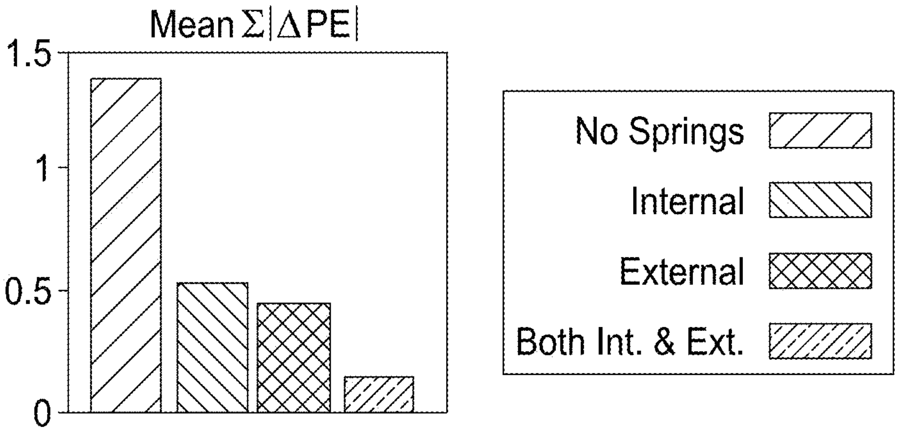
FIG. 2D illustrates that when considering more than one orientation, spring parameters are found so that the mean ($\Sigma|\Delta PE_T|$) is minimized. The case with both internal and external torsional springs results in the lowest mean ($\Sigma|\Delta PE_T|$).
Figure 2E:
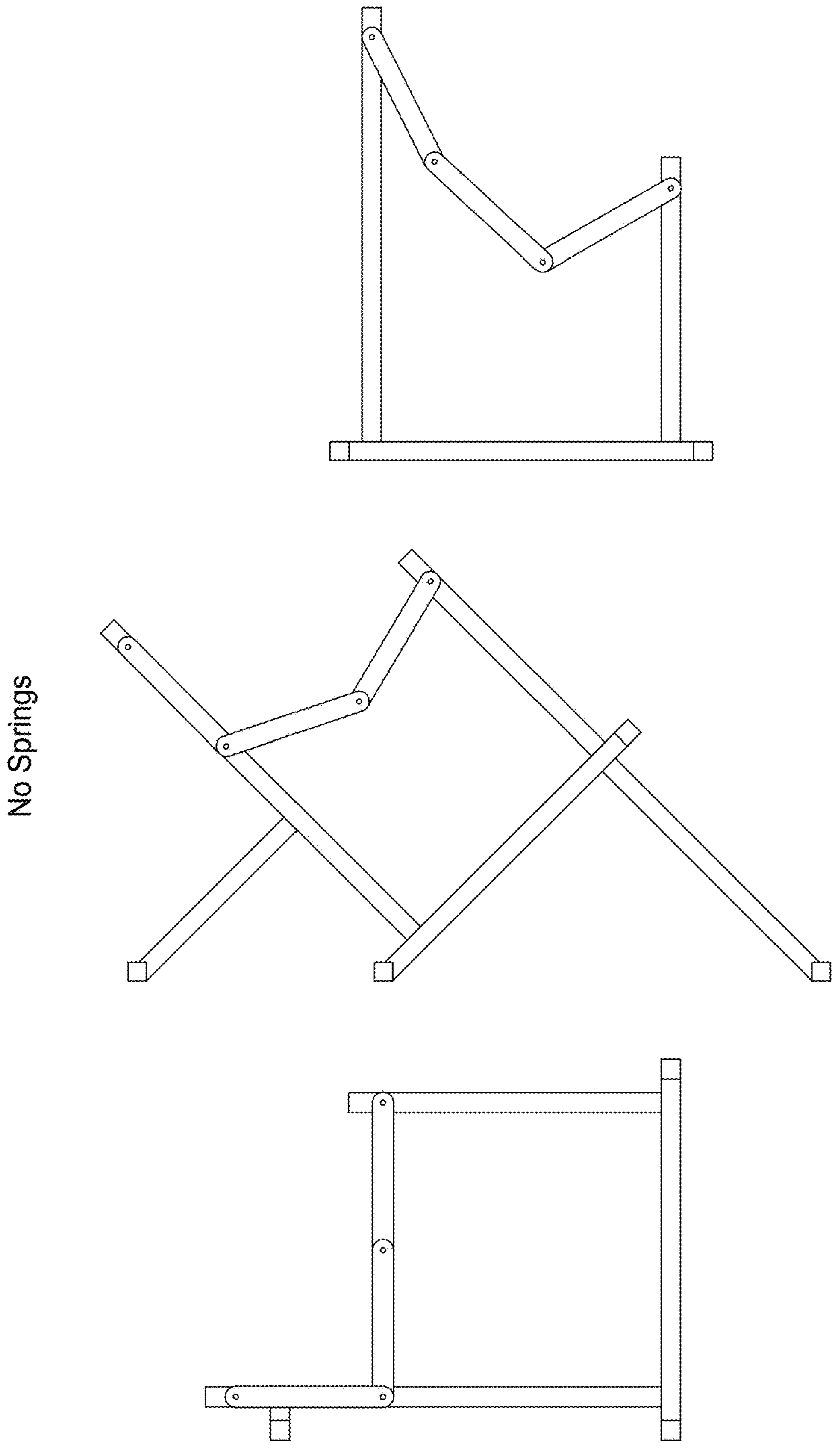
FIG. 2E illustrates that without springs, the Watt's linkage collapses due to gravity.

The Watt's linkage optimized with one external torsional spring leads to a more effective minimization of the mean $(\Sigma|\Delta PE_T|)$ than the case with only internal torsional springs (FIGS. 2B-2D). For $\psi=90°$, $\Sigma|\Delta PE_T|$ is still higher than the case with no springs (FIG. 2C), but not as high as the internal spring case. The case with only one external spring reduces the mean $(\Sigma|\Delta PE_T|)$ by 67.8% to 0.445 N-m.

Finally, we consider adding both the four internal torsional springs and one external torsional spring. The total potential energy in the system for this case is expressed as $$PE_T(\phi,\psi) = \sum_i^n PE_{Gi}(\phi,\psi) + \sum_j^m PE_{Sj}(\phi) + PE_E(\phi,\psi) \quad [8]$$

The design variables of the optimization problem are the stiffnesses and rest angles of all springs, internal and external, and the objective is again to minimize the mean $(\Sigma|\Delta PE_T|)$ over all desired orientations.

$$\min\left(\text{mean}\left(\sum|\Delta PE_T(\phi,\psi)|\right)\right) \quad [9]$$
$$\text{s.t. } k_j > 0$$
$$\alpha_j \in [\theta_{jmin}, \theta_{jmax}]$$
$$k_E > 0$$
$$\alpha_E \in [0, 2\pi].$$

Optimizing both internal and external torsional springs significantly improves upon the results from the other two cases. The potential energy curves are nearly flat for $\psi=0°$, 45°, and 90° (FIG. 2B), and the $\Sigma|\Delta PE_T|$ is decreased for nearly all orientations (FIG. 2C). By adding both sets of torsional springs, we reduce mean $(\Sigma|\Delta PE_T|)$ to 0.137 Nm, a 90% reduction from the case with no springs (FIG. 2D). It is possible to reduce the mean ($\Sigma|\Delta PE_T|$) further by limiting the system to a smaller range of $\psi$; for instance, the mean ($\Sigma|\Delta PE_T|$) is 0.0602 N-m for a range of $\psi$=0° to 30°.

Figure 2F:
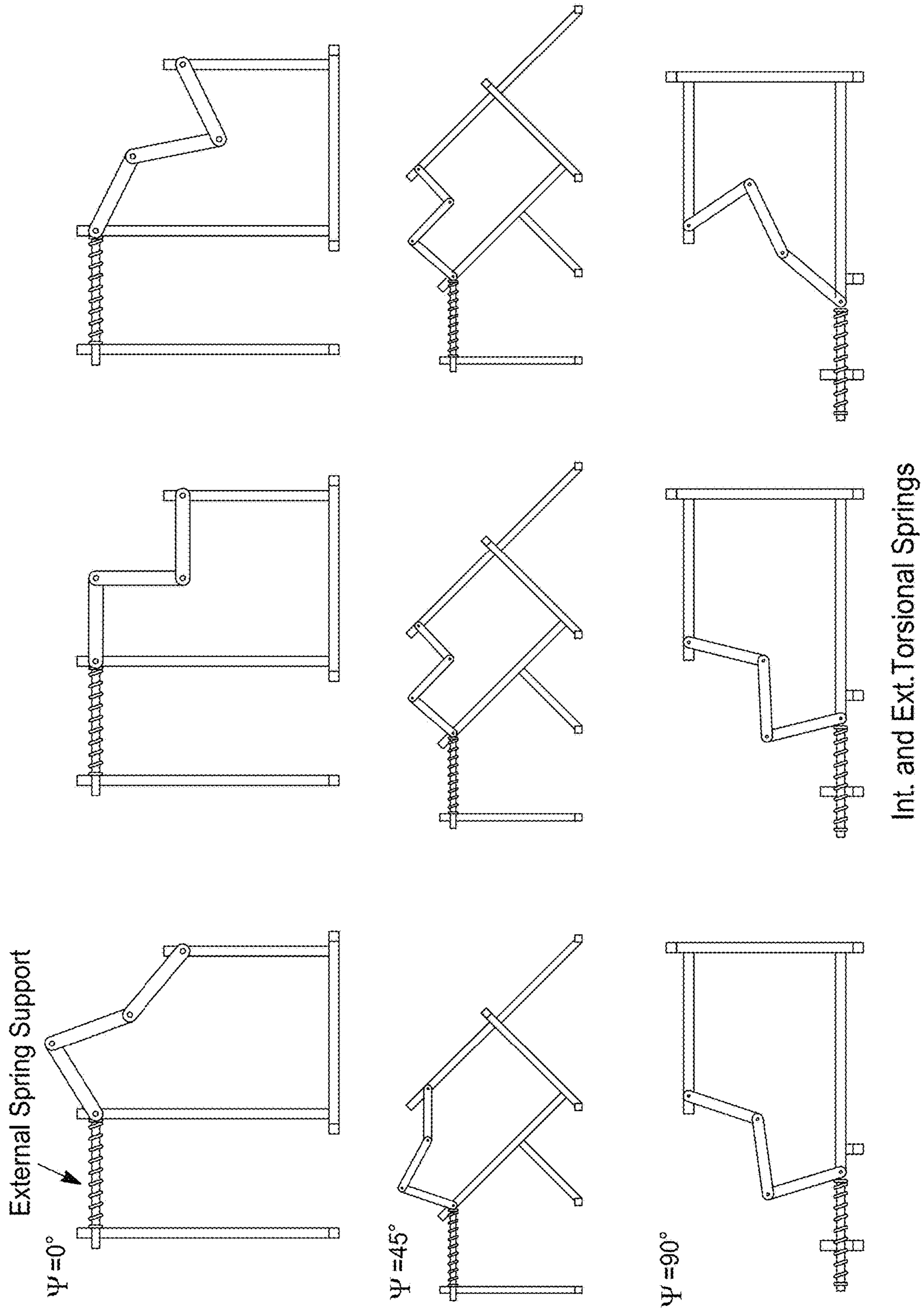
FIG. 2F illustrates experimental results that demonstrate that adding both internal and external torsional springs to the Watt's linkage allows for continuous equilibrium reconfiguration at $\psi$=0°, 45°, and 90°.
Figure 2G:
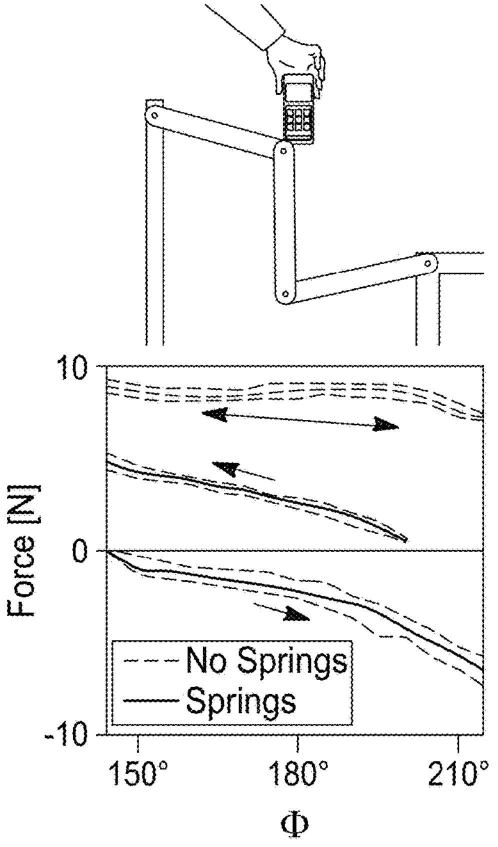
FIG. 2G illustrates that the Watt's linkage with springs according to the present teachings requires a lower force for reconfiguration (measured using a force gauge as shown) than the conventional system without springs.

We fabricated a physical prototype of the Watt's linkage with four internal torsional springs and one external torsional spring. Despite using springs with properties that deviate from the optimized solution, with both sets of torsional springs, the Watt's linkage does not collapse and can be easily reconfigured at $\psi$=0°, 45°, and 90° (FIG. 2F). We measure the vertical force required to reconfigure the Watt's linkage using a force gauge (FIG. 2G). The linkage with springs requires a lower reconfiguration force than the system without springs; the absolute value of the force is reduced by 70% on average. The direction of reconfiguration (up or down along the kinematic path) affects the magnitude of the force, which increases as the Watt's linkage moves further from $\phi$=180°, where the center point of the floating link no longer traces a vertical line. Friction in the system also contributes to the increase in force at the ends of the kinematic path; improved fabrication methods could minimize the effect of friction. Additionally, using springs with properties that better match the optimized solution could further reduce the force required for reconfiguration. The spring properties and details on the fabrication and testing are included in the Supporting Information.

Effect of Spring Kinematic Relationships on System Performance

Figure 3A:
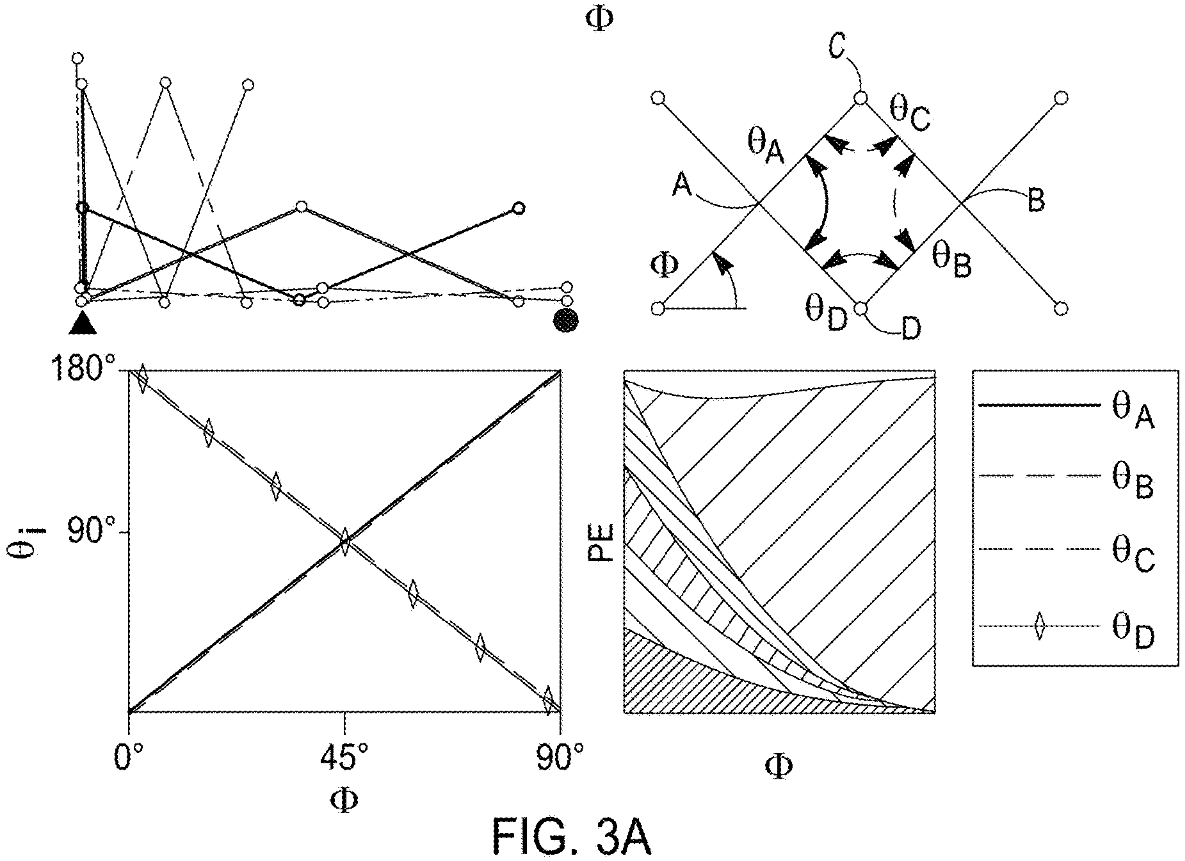
FIG. 3A illustrates a Scissor Mechanism having two sets of symmetric angles that are linearly related.

This section explores how system kinematics influence the performance of different spring types when optimizing for continuous equilibrium. We explore a Scissor Mechanism, where internal torsional springs can be placed in four locations, (A, B, C, and D in FIG. 3A). When optimized, the $PE_T$ curve is not as flat as the optimal result for the Watt's linkage, and quantitatively $\Sigma|\Delta PE_T|$ is only reduced by 88% (from 1.77 N-m to 0.214 N-m). This smaller reduction is because the Scissor Mechanism is a symmetric linkage with all spring angles being linearly related: $\theta_A=\theta_B$, $\theta_C=\theta_D$, and $\theta_C=180°-\theta_A$ (FIG. 3A). Thus, the potential energy due to the internal springs consists of four quadratic (2nd-order) terms; in fact, using a single or any combination of springs results in roughly the same overall performance. A contrasting example is a non-symmetric Double Rocker linkage, which has four angles with kinematic paths that are not symmetric nor linearly related, and include 1st, 3rd, and 4th order terms with respect to. The variety of higher order terms in $PE_T$ gives the system more freedom to offset the gravity curve and to reduce $\Sigma|\Delta PE_T|$ by more than 99%.

Figure 3B:
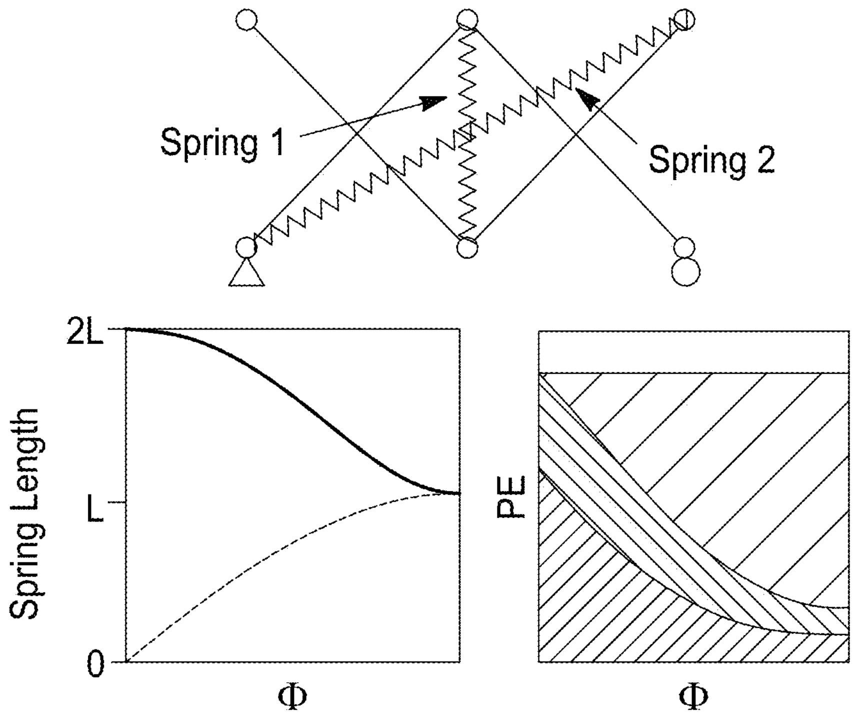
FIG. 3B illustrates a Scissor Mechanism having two internal extensional springs.
Figure 3C:
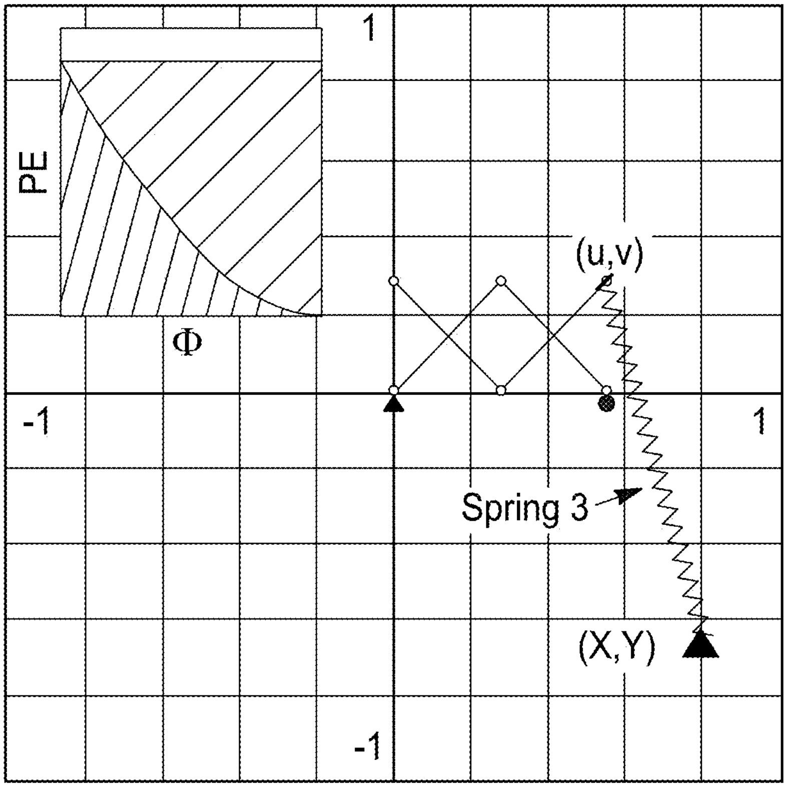
FIG. 3C illustrates a Scissor Mechanism having one external extensional spring, which results in total potential energy curves that are flatter than the case with four internal torsional springs. For the case with an external extensional spring, the anchor position (X,Y) and spring properties are found using optimization.

From a practical perspective, the 88% improvement for the Scissor Mechanism may be sufficient to reduce actuation forces and improve stability. A physical prototype that would otherwise collapse under gravity remains stable and requires a much lower reconfiguration force when four torsional springs are added. For further improvement to the continuous equilibrium performance, we can also add extensional springs. The potential energy of an internal extensional spring x is $PE_x=\frac{1}{2}k_x(L_x-L_{0x})^2$, where k is the spring stiffness (units: N/m), $L_x(\phi)$ is the length of the spring which depends on the kinematics, and $L_0$ is the rest length (units: m). The extensional spring kinematics have sinusoidal relationships with respect to $\phi$ and are not symmetric with each other (Springs 1 and 2, FIG. 3B). This variation in kinematic relationships allows the extensional springs to minimize $\Sigma|\Delta PE_T|$ to 0.004 N-m (a 99.8% reduction). In some embodiments, an external extensional spring is added, with one end attached to the Scissor Mechanism and the other end anchored to an external support (Spring 3, FIG. 3C). In this case, the design parameters of the optimization problem are the (X,Y) coordinates of the external anchor point along with the stiffness and rest length of the spring. The potential energy of the external extensional spring is $$PE_X=\frac{1}{2}k_X\left(\sqrt{(u-X)^2+(v-Y)^2}-L_{0X}\right)^2$$

where $k_X$ is the spring stiffness (units: N/m), $L_{0X}$ is the rest length (units: m) and $(u(\phi), v(\phi))$ is the point where the spring is attached to the Scissor Mechanism. Adding only this external extensional spring reduces $\Sigma|\Delta PE_T|$ from 1.77 N-m to 0.0065 N-m (a 99.6% reduction). In some embodiments, one may use nonlinear springs and design these springs to directly counteract the gravity curve.

Figure 3D:
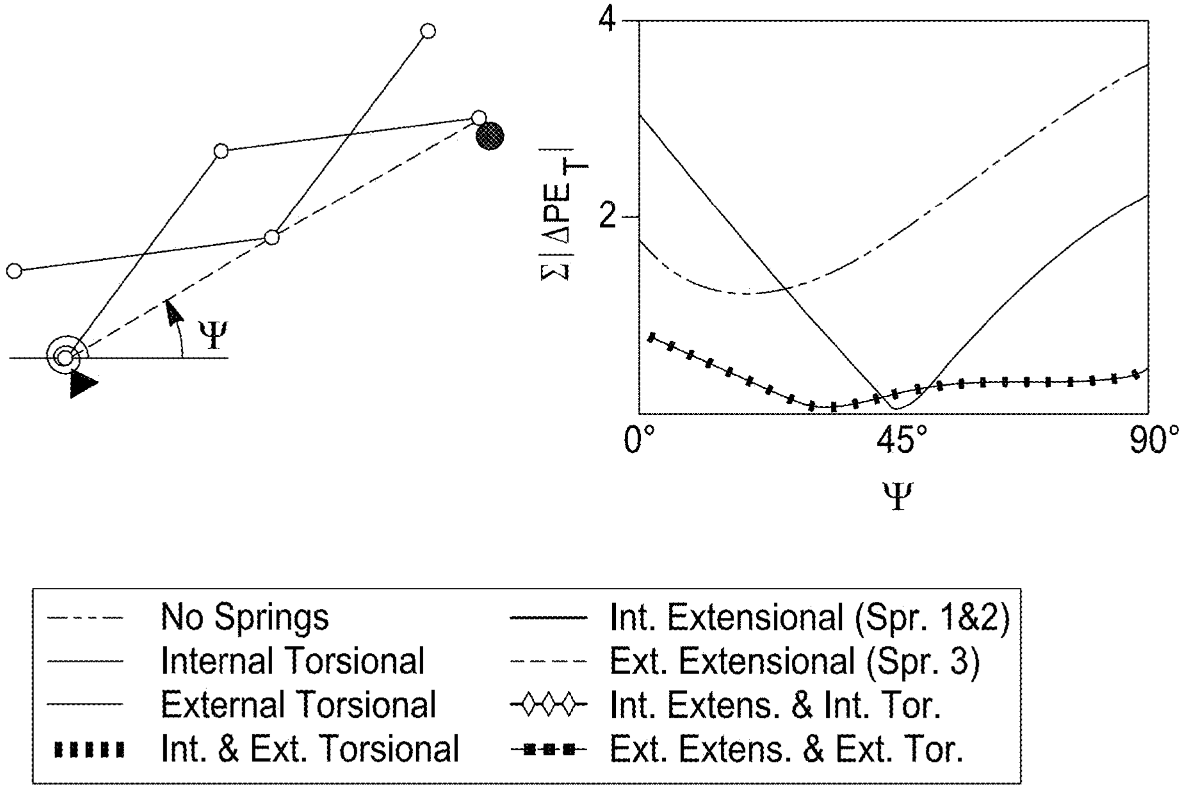
FIG. 3D illustrates reorientation of the Scissor Mechanism, considering several cases with torsional springs. The external spring reduces mean ($\Sigma|\Delta PE_T|$) for the range of $\psi$=0° to 90°.
Figure 3E:
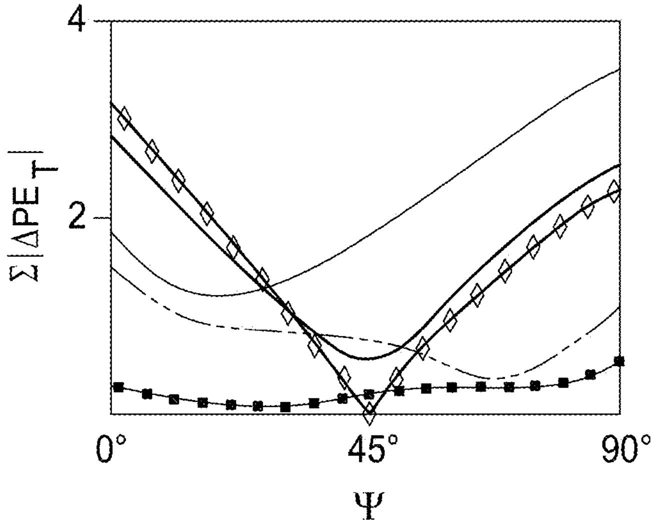
FIG. 3E illustrates reorientation of the Scissor Mechanism for various cases with extensional springs. The case with one external extensional spring and one external torsional spring is the most effective at minimizing $\Sigma|\Delta PE_T|$ for nearly all orientations.
Figure 3F:
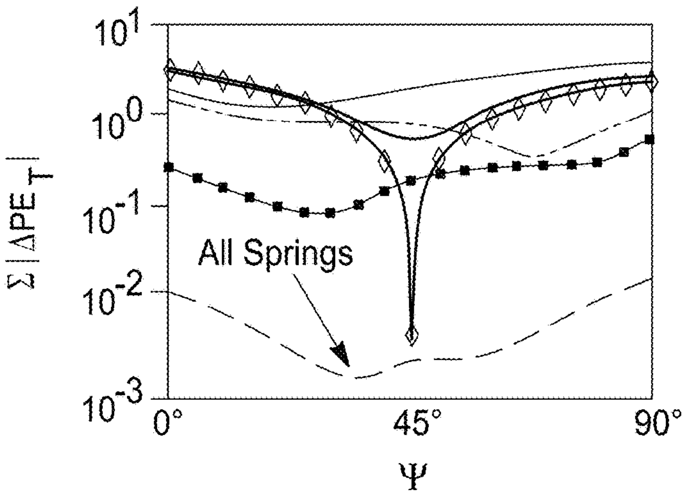
FIG. 3F illustrates that when all springs are added, $\Sigma|\Delta PE_T|$ is significantly reduced for all orientations.
Figure 3G:
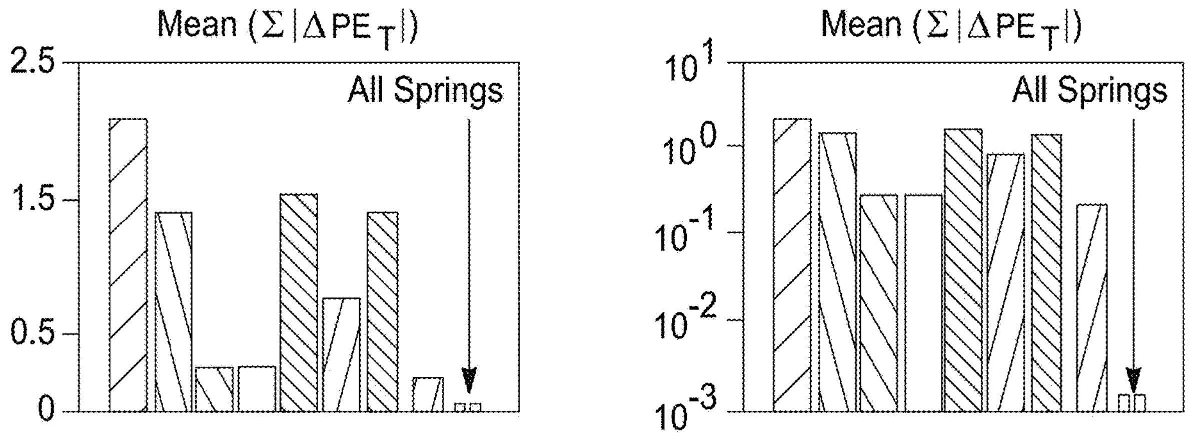
FIG. 3G illustrates bar plots of the mean ($\Sigma|\Delta PE_T|$) for all cases.

We also consider the reorientation of the Scissor Mechanism from $\psi$=0° to 90° (FIGS. 3D-3G). Similar to the Watt's linkage, adding an external torsional spring and attaching it to a horizontal ground reference is more effective at providing continuous equilibrium at different orientations because its potential energy is dependent on both configuration @ and orientation w (FIG. 3D). The same is true when considering extensional springs where a single spring attached to an external point provides a substantial advantage for obtaining continuous equilibrium in all orientations (FIG. 3E). Using all potential spring types in the optimization framework allows for near perfect continuous equilibrium performance in all orientations of the Scissor Mechanism (note the logarithmic scale in FIG. 3F). In reality, the case with only the external torsional and external extensional springs may suffice, as this combination provides a 89% reduction in the mean ($\Sigma|\Delta PE_T|$).

Extension to Various Design Cases

Figure 4A:
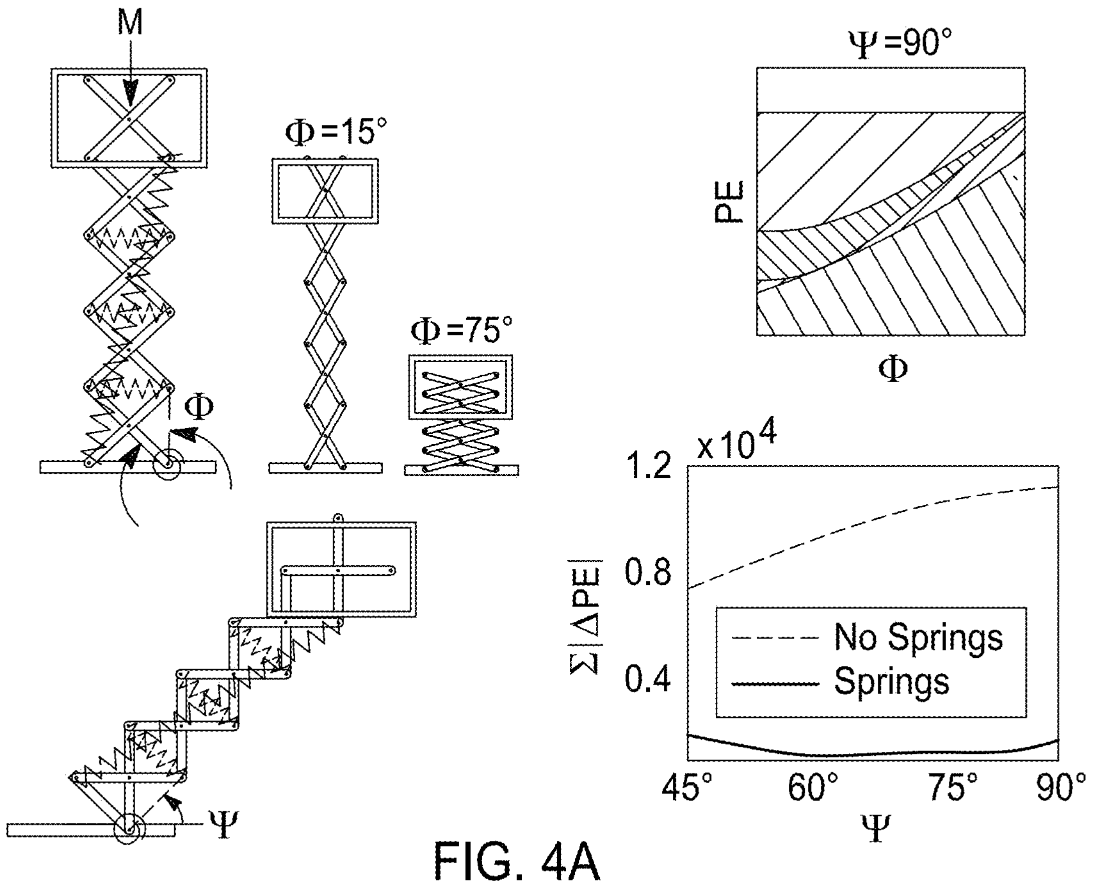
FIG. 4A illustrates a system designed to have continuous equilibrium according to some embodiments of the present teachings, including a scissor lift that counterbalances an external mass in any orientation between $\psi$=45° and 90°.
Figure 4B:
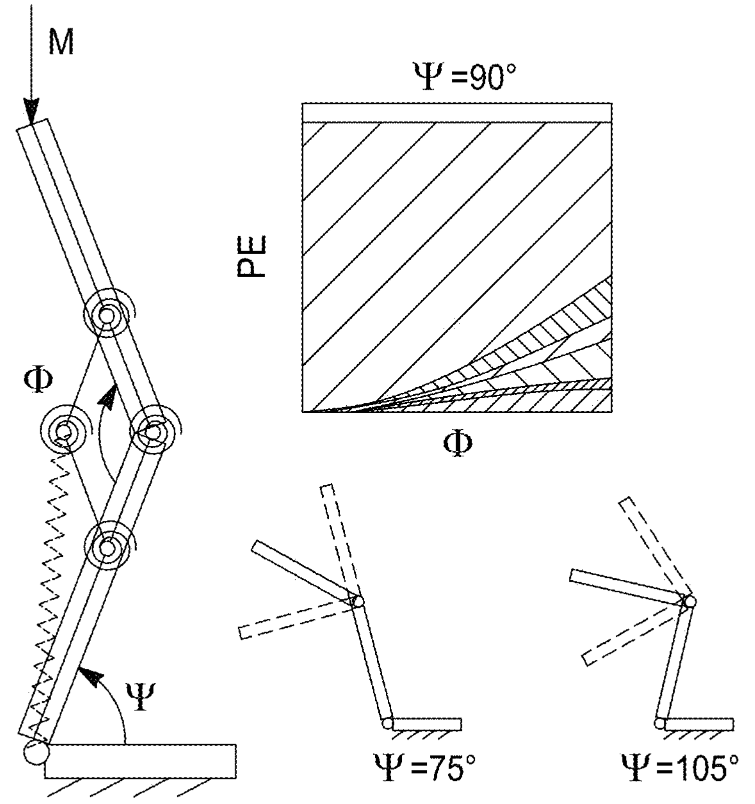
FIG. 4B illustrates a system designed to have continuous equilibrium according to some embodiments of the present teachings, including a knee exoskeleton that supports a vertical load for different radial paths that change with orientation.
Figure 4C:
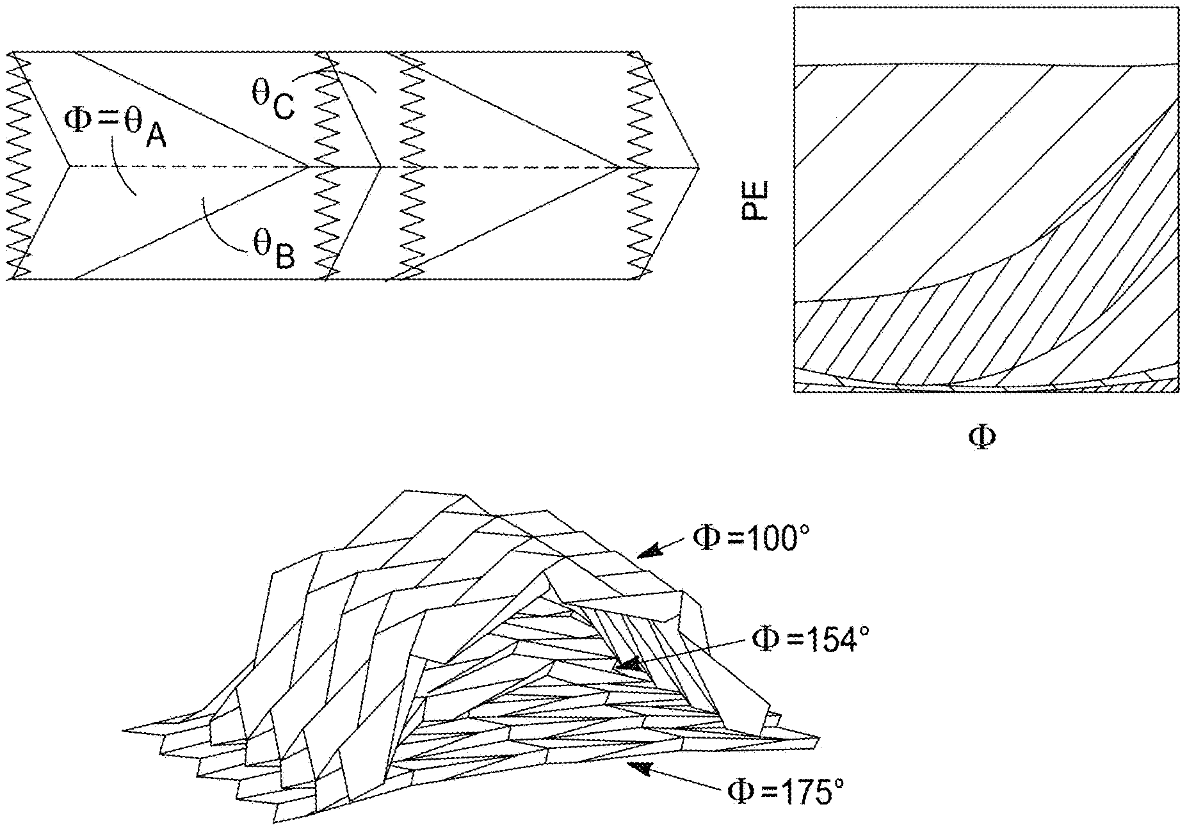
FIG. 4C illustrates a system designed to have continuous equilibrium according to some embodiments of the present teachings, including a three-dimensional origami arch structure that deploys from a flat state.

The optimization method can be expanded from simple four bar linkages to structures where additional complexity needs to be incorporated. In some embodiments, the method can be used to design a scissor lift, a model of a knee, and an origami arch (FIGS. 4A-4C). These examples add complexity by including an external mass carried along a linear or radial path and expanding the principles to a three-dimensional origami structure.

The scissor lift is a larger version of the Scissor Mechanism at $\psi$=90°, with equivalent kinematics and the addition of an external mass that is carried along a linear path. We model the linkage with all member lengths of 1 m, uniform mass distribution equal to 10 kg/m, and an external mass (to represent the weight of the basket and occupants) of M=200 kg, with its center located at the midpoint of the last scissor unit (FIG. 4A). Based on the results in FIG. 3A and following, we chose to use an external torsional spring and two internal extensional springs to obtain continuous equilibrium. At the orientation $\psi$=90°, adding these springs leads to a nearly flat potential energy curve where $\Sigma|\Delta PE_T|$ is reduced by 99.8%, from 9417.6 N-m to 16.95 N-m. This combination of springs reduces $\Sigma|\Delta PE_T|$ comparably for other orientations and reduces the mean ($\Sigma|\Delta PE_T|$) by 84% for a range of orientations $\psi$=45° to 90°.

Next, we model a knee exoskeleton as a planar linkage with two members resembling the human leg and four shorter bars of equal length positioned at the knee joint (FIG. 4B). The structure carries an external mass along a variable radial path. The lower "calf" member defines the orientation w of the system, while the upper "thigh" member reconfigures with kinematics defined by the angle ¢ with respect to the calf member. The self-weight of the members (2.5 kg each) is applied at their centroids and an external mass M=30 kg is applied at the top of the thigh member. After exploring different combinations, we chose to use four internal torsional springs and one internal extensional spring to obtain continuous equilibrium. The magnitude of the potential energy due to gravity of the system changes with the orientation $\psi$, but the shape of the PEG curve does not, so internal springs are sufficient to minimize the mean ($\Sigma|\Delta PE_T|$). Adding springs reduces the mean ($\Sigma|\Delta PE_T|$) by 98% for orientations $70°<\psi<105°$, from 128.7 N-m to 2.65 N-m (FIG. S8(C)). FIG. 4B shows the plot of the potential energy contributions for $\psi$=90. With the structure optimized for continuous equilibrium, the external mass is now counterbalanced both during reconfiguration of the knee joint and as the structure reorients about the ankle joint.

The three-dimensional origami arch (FIG. 4C) is made from a variation of the Miura-ori unit cell, which is the base for many origami structures. The arch is a single DOF mechanism consisting of sixty-four origami panels that fold from a flat state, with kinematics defined by the fold angle $\phi$ (FIG. 4C). We model the structure with a uniform mass distribution of 1 kg/m$^2$ and panel areas of approximately 0.1 m$^2$. To keep the design simple, we limit possible spring connection points to locations within each unit cell. The optimization suggests using three internal torsional springs at the fold lines of the pattern ($\theta_A$, $\theta_B$, and $\theta_C$) and two internal extensional springs on each cell. The $\Sigma|\Delta PE_T|$ is reduced by 96.1%, from 43.0 N-m to 1.69 N-m as it deploys from $\phi$=175° to 100°. This example demonstrates that the principles from the present teachings can be readily extended to an arbitrary three-dimensional system. While we limit the design to springs internal to each unit cell, the arch structure could be optimized using springs that interconnect any of the sixty-four panels. All of the possible spring connection points could be explored using a method similar to the ground structure approach used in topology optimization.

Considerations for Practical Implementation

We envision that the optimization method proposed in the present disclosure can be used to design large-scale deployable and reconfigurable structures with reduced energy needed for actuation. However, aspects beyond the potential energy curve need to be considered to inform the practical implementation of these systems. In this section, we explore the Watt's linkage to study residual displacements in the optimized systems, the reduction in actuation energy, and the influence of locking once the system reaches a desired state.

Residual Displacements.

Even when using springs with optimized parameters are placed on a system, the combined effects of gravity and spring forces may be imbalanced, leading to residual displacements (FIG. 5A). To calculate these potential residual displacements, we use a traditional structural engineering approach, constructing a stiffness matrix [K] that represents the structure and solving for displacements $\{\delta\}=[K]^{-1}\{F\}$, where $\{F\}$ is the vector of applied loads, consisting of member self-weight and torsional spring moments. Displacements are measured at the midpoint of the floating link and remain less than 10% of member length for any point along the kinematic path. For this idealized system, the only component that resists the residual displacements is the stiffness of the springs. In practical scenarios, these residual displacements would be much lower due to friction in the system; for example, the physical prototype of the Watt's linkage at $\psi$=0° had minimal residual displacements when reconfigured along the kinematic path. In the following subsections, we show that despite the internal force imbalance, there is still a major reduction in the energy required for actuation, and that locking serves as a practical approach to adding stiffness and preventing these residual displacements.

Reduced Energy for Actuation.

We use the stiffness matrix formulation to explore the Watt's linkage when a torsional actuator placed at location A is used to move the structure through its kinematic path. The actuator applies a moment MA to the structure in order to rotate it by an angle $\xi$. This the angle between the equilibrium configuration due to gravity and spring forces and the desired configuration defined by $\phi$ (FIG. 5B). We compare the energy in the actuator for the case with no springs and the case with four internal torsional springs (with properties found using optimization). The energy in the actuator EA is equal to MA multiplied by $\xi$. For the case of the Watt's linkage with four internal torsional springs, EA is nearly zero for the entire kinematic path (FIG. 5C). Larger actuation moments are required at the ends of the kinematic path where the linkage no longer traces a vertical line, a similar trend to that shown in experimental results shown in FIG. 2G. This result considers that the actuator must overcome both the residual displacements and the stiffness of the internal springs when reconfiguring the structure. Similar trends are seen for the Watt's linkage at $\psi$=45°.

Locking. In reality, the optimized continuous equilibrium structures will remain flexible (similar to a mechanism) and locking of the system would be necessary to provide stiffness for functional load-bearing applications. The structural stiffness of the Watt's linkage with internal torsional springs is computed using the stiffness matrix formulation where a unit force is applied in the middle of the linkage. Without locking, the linkage only has high stiffness in the horizontal direction at the center of the kinematic path, where the midpoint of the floating bar traces a vertical path (FIG. 5D). In the vertical direction, the linkage is overly flexible and locking the four rotational joints (DOFs) increases the stiffness by several orders of magnitude (FIG. 5E). The large increase in stiffness from joint locking occurs because the individual members can now carry loads in bending. The number and combination of locked nodes will also affect the structural stiffness. In the horizontal direction, locking locations BC, ABC, and BCD all result in the same stiffness as locking at all locations (FIG. 5F). In the vertical direction, locking more nodes always leads to a higher stiffness, although the structure remains more flexible than in the horizontal direction. While the stiffness of locking combinations change slightly for different systems configurations the general trends stay the same.

CONCLUSIONS

In the present disclosure, we introduce a comprehensive method for designing reconfigurable structures that maintain continuous equilibrium. The present method involves optimizing the properties of internal, external, torsional, and extensional springs that counteract gravity to minimize the fluctuation of the potential energy curve throughout the kinematic path. The optimization framework is extended to optimize structures for a range of orientations, leading to one design that has continuous equilibrium properties even as the orientation of the structure changes. Combinations of springs with asymmetric kinematics tend to result in better performance, and external springs are the most effective when considering a structure at multiple orientations. It was demonstrated that the present design method and system can be applied to real-world systems including a linkage with an external mass carried along a linear path, a linkage with a mass carried along a radial path, and a three-dimensional deployable origami arch. Using computational simulations and physical proof-of-concept prototypes, we show that the proposed continuous equilibrium structures enable more efficient actuation. Using optimization to design for continuous equilibrium results in reconfigurable structures that are more safe, stable, efficient, and versatile for any application scenario. The framework presented herein will expand the ability of designers and engineers to create versatile, multi-functional systems to be used in robotics, infrastructure, consumer products, architecture, and more.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of configuring and constructing a continuous equilibrium system comprising:

providing a plurality of rigid members each pivotally coupled to an adjacent rigid member at a pivot joint, the plurality of rigid members being pivotally reconfigurable as a linkage system into a plurality of orientations along a kinematic path in three-dimensional space;

determining a potential energy of each of the plurality of rigid members as a result of gravity along the kinematic path and a total potential energy as a sum of the potential energy of each of the plurality of rigid members;

calculating a spring bias at a spring position located at one or more of the plurality of pivot joints to exert a biasing force upon at least one of the plurality of rigid members sufficient to offset gravity such that the total potential energy is maintained generally constant irrespective of the orientation along the kinematic path; and providing at least one spring member having the spring bias mounted at the spring position.

2. The method according to claim 1 wherein the step of providing the plurality of rigid members each pivotally coupled to the adjacent rigid member at the pivot joint comprises providing the plurality of rigid members each pivotally coupled to form an input link pivotally coupled to a floating link pivotally coupled to an output link, the input link and the output link being pivotally coupled to an imaginary ground link formed between a pair of support nodes.

3. The method according to claim 1 wherein the step of providing the plurality of rigid members each pivotally coupled to the adjacent rigid member at the pivot joint comprises providing the plurality of rigid members arranged in a scissor mechanism.

4. The method according to claim 1 wherein the step of providing the plurality of rigid members each pivotally coupled to the adjacent rigid member at the pivot joint comprises providing the plurality of rigid members arranged in a scissor lift mechanism.

5. The method according to claim 1 wherein the step of providing the plurality of rigid members each pivotally coupled to the adjacent rigid member at the pivot joint comprises providing the plurality of rigid members arranged in an origami arch structure.

6. The method according to claim 1 wherein the step of calculating a spring bias at the spring position located at one or more of the plurality of pivot joints comprises calculating the spring bias based on a spring stiffness and a spring rest angle.

7. The method according to claim 1 wherein the step of providing at least one spring member having the spring bias comprises providing at least one torsional spring member having the spring bias.

8. The method according to claim 1 wherein the step of providing at least one spring member having the spring bias comprises providing at least one extensional spring member having the spring bias.

9. The method according to claim 1 wherein the step of calculating a spring bias at a spring position located at one or more of the plurality of pivot joints comprises calculating a spring bias at a plurality of spring positions located the plurality of pivot joints, and wherein the step of providing at least one spring member having the spring bias mounted at the spring position comprises providing a plurality of spring members having the corresponding spring bias mounted at the plurality of spring positions.

10. A continuous equilibrium system comprising:

a plurality of rigid members each pivotally coupled to an adjacent rigid member at a pivot joint, the plurality of rigid members being pivotally reconfigurable as a linkage system into a plurality of orientations along a kinematic path in three-dimensional space;

at least one spring member having a spring bias, the at least one spring member being mounted at a spring position located at one or more of the plurality of pivot joints to exert a biasing force upon at least one of the plurality of rigid members, the spring bias being sufficient to offset gravity such that a total potential energy is maintained generally constant irrespective of the orientation along the kinematic path, the total potential energy being a sum of a potential energy of each of the plurality of rigid members as a result of gravity along the kinematic path.

11. The continuous equilibrium system according to claim 10 wherein the plurality of rigid members comprises an input link pivotally coupled to a floating link pivotally coupled to an output link, the input link and the output link being pivotally coupled to an imaginary ground link formed between a pair of support nodes.

12. The continuous equilibrium system according to claim 10 wherein the plurality of rigid members comprises a scissor mechanism.

13. The continuous equilibrium system according to claim 10 wherein the plurality of rigid members comprises a scissor lift mechanism.

14. The continuous equilibrium system according to claim 10 wherein the plurality of rigid members comprises an origami arch structure.

15. The continuous equilibrium system according to claim 10 wherein the spring bias is based on a spring stiffness and a spring rest angle.

16. The continuous equilibrium system according to claim 10 wherein the at least one spring member having the spring bias comprises at least one torsional spring member having the spring bias.

17. The continuous equilibrium system according to claim 10 wherein the at least one spring member having the spring bias comprises at least one extensional spring member having the spring bias.

18. The continuous equilibrium system according to claim 10 wherein the at least one spring member having a spring bias comprises a plurality of spring members mounted at a plurality of spring positions located at the plurality of pivot joints to exert a biasing force upon the plurality of rigid members, the combination of spring bias of the plurality of spring members being sufficient to offset gravity such that the total potential energy is maintained generally constant irrespective of the orientation.

* * * * *